United States Patent [19]

Vogel et al.

[11] Patent Number: 4,465,410

[45] Date of Patent: Aug. 14, 1984

[54] PNEUMATICALLY-PROPELLED CARRIER SYSTEM

[75] Inventors: Victor J. Vogel, Oak Ridge; Robert E. Morano, Ringwood, both of N.J.

[73] Assignee: American Standard Inc., New York, N.Y.

[21] Appl. No.: 388,975

[22] Filed: Jun. 16, 1982

[51] Int. Cl.³ .............................................. B65G 51/32
[52] U.S. Cl. ..................................... 406/111; 406/186
[58] Field of Search .............. 406/111, 112, 110, 184, 406/185, 186, 190, 191, 176, 180, 147–150, 177–179

[56] References Cited

U.S. PATENT DOCUMENTS 3,189,297  6/1965  Ellithorpe ........................... 406/111
3,689,010  9/1972  Alexandrov et al. .

FOREIGN PATENT DOCUMENTS 387903  10/1973  U.S.S.R. .............................. 406/176

Primary Examiner—Jeffrey V. Nase
Assistant Examiner—Daniel R. Edelbrock
Attorney, Agent, or Firm—Wood, Herron & Evans

[57] ABSTRACT

A pneumatically-propelled carrier system including a pneumatic system tube of generally circular cross section interconnecting a first terminal constructed to permit the carrier to be removed, that is, a "free carrier" terminal, and a second terminal constructed to prevent removal of the carrier, while providing access to it through a terminal access opening, this latter terminal being a "captive carrier" terminal. Since the system tube interconnecting the captive and free terminals has a generally circular cross section, the carrier, regardless of its cross section, is free to assume any rotational orientation about its longitudinal axis. To align a carrier access opening provided in the carrier and the terminal access opening of the captive carrier terminal when a carrier is received, to permit access to the carrier interior, a carrier rotating assembly is provided at the captive carrier terminal for rotating the carrier upon arrival to a predetermined rotational orientation wherein the carrier access opening aligns with the terminal access opening. Several additional features of the system are also disclosed, such as a cover and latching mechanism for the carrier which requires that both the latch mechanism and the cover be depressed to facilitate opening; a mechanism for automatically opening the carrier cover when it has been rotated to the predetermined orientation, aligning its opening with that of the terminal; and a sill and associated automatic operating mechanism which bridges the lower edges of the carrier and terminal access openings to prevent articles from falling into the space between them in the course of insertion or removal of an article relative to the interior of the carrier as an incident to a transaction at the captive carrier terminal.

22 Claims, 15 Drawing Figures

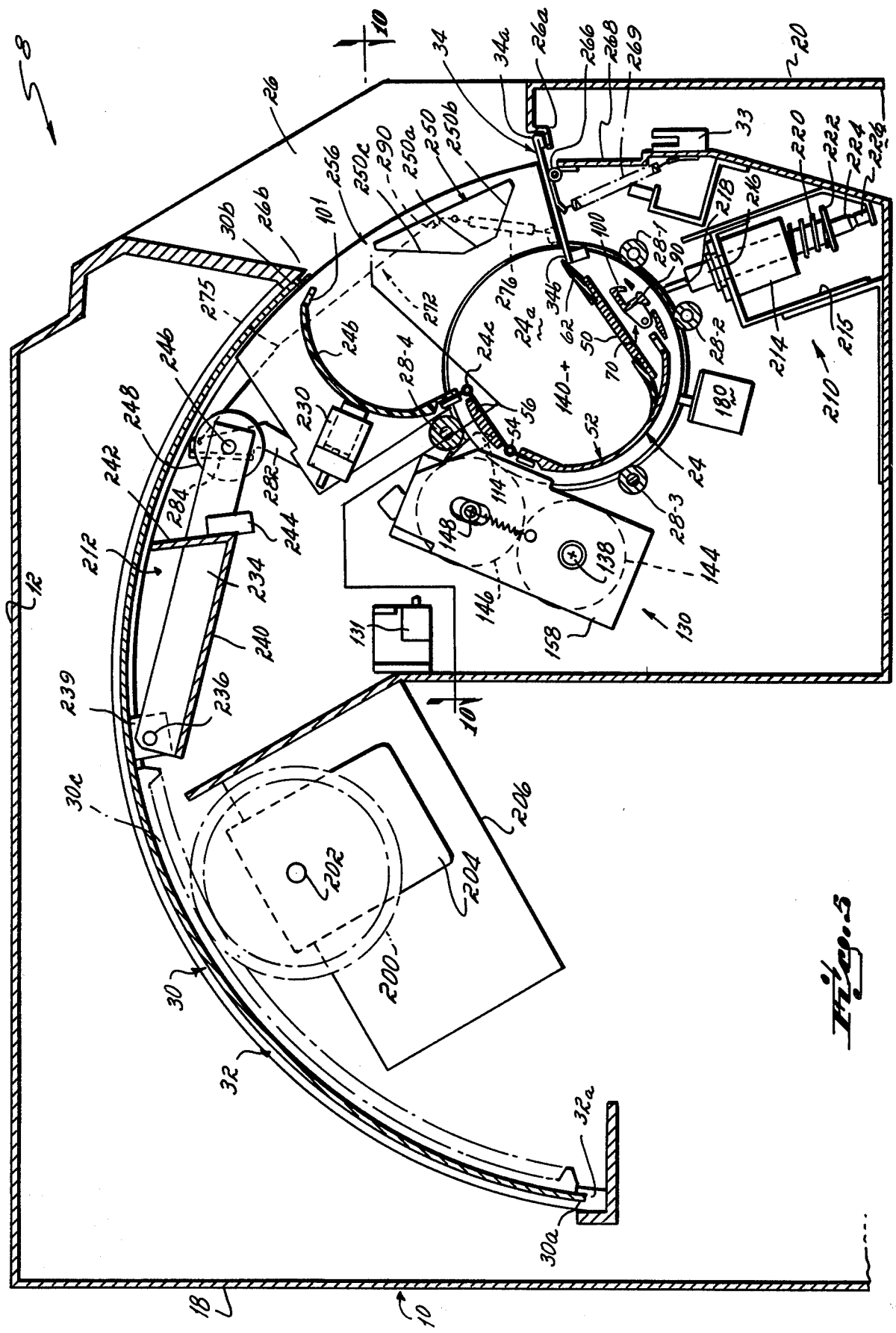

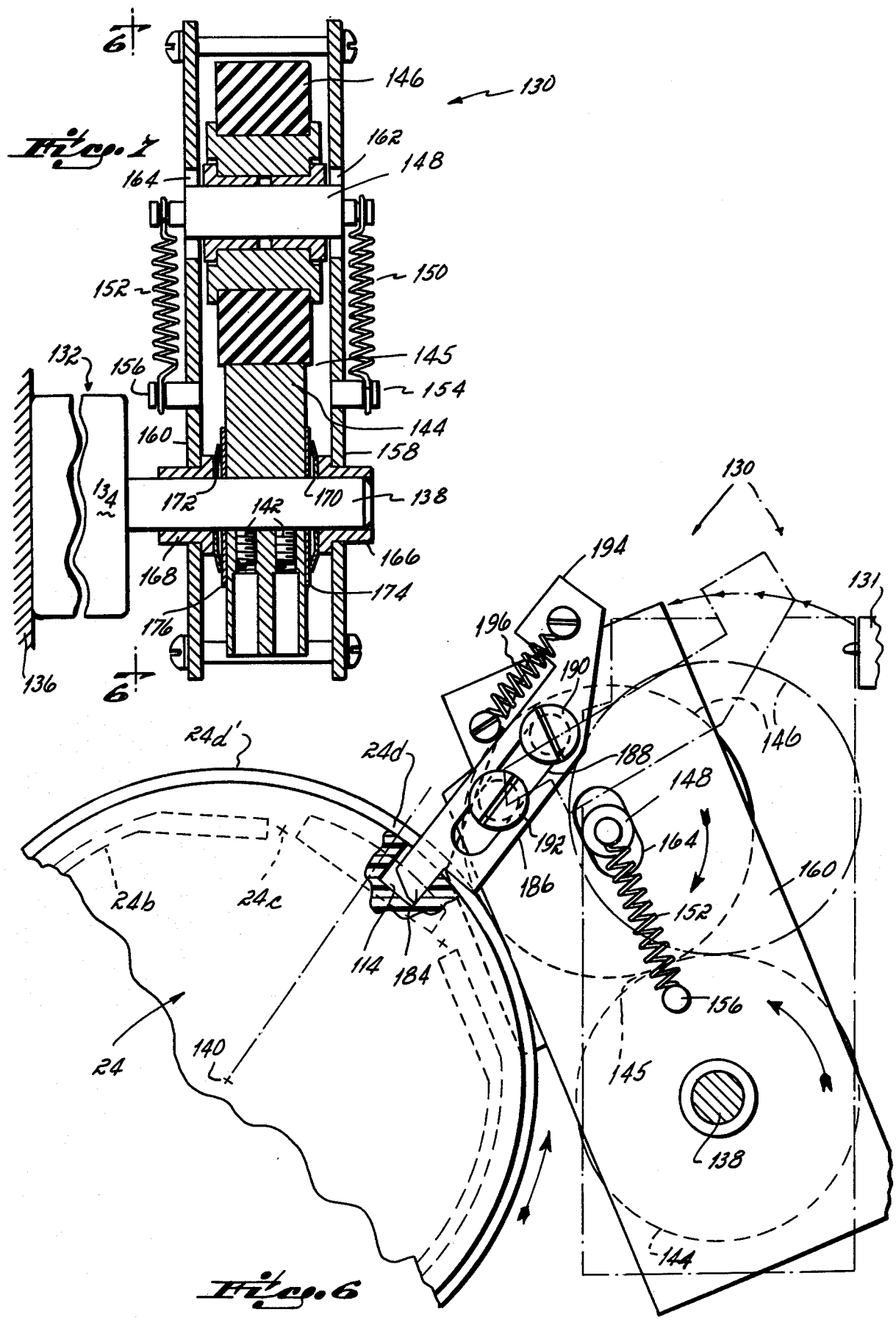

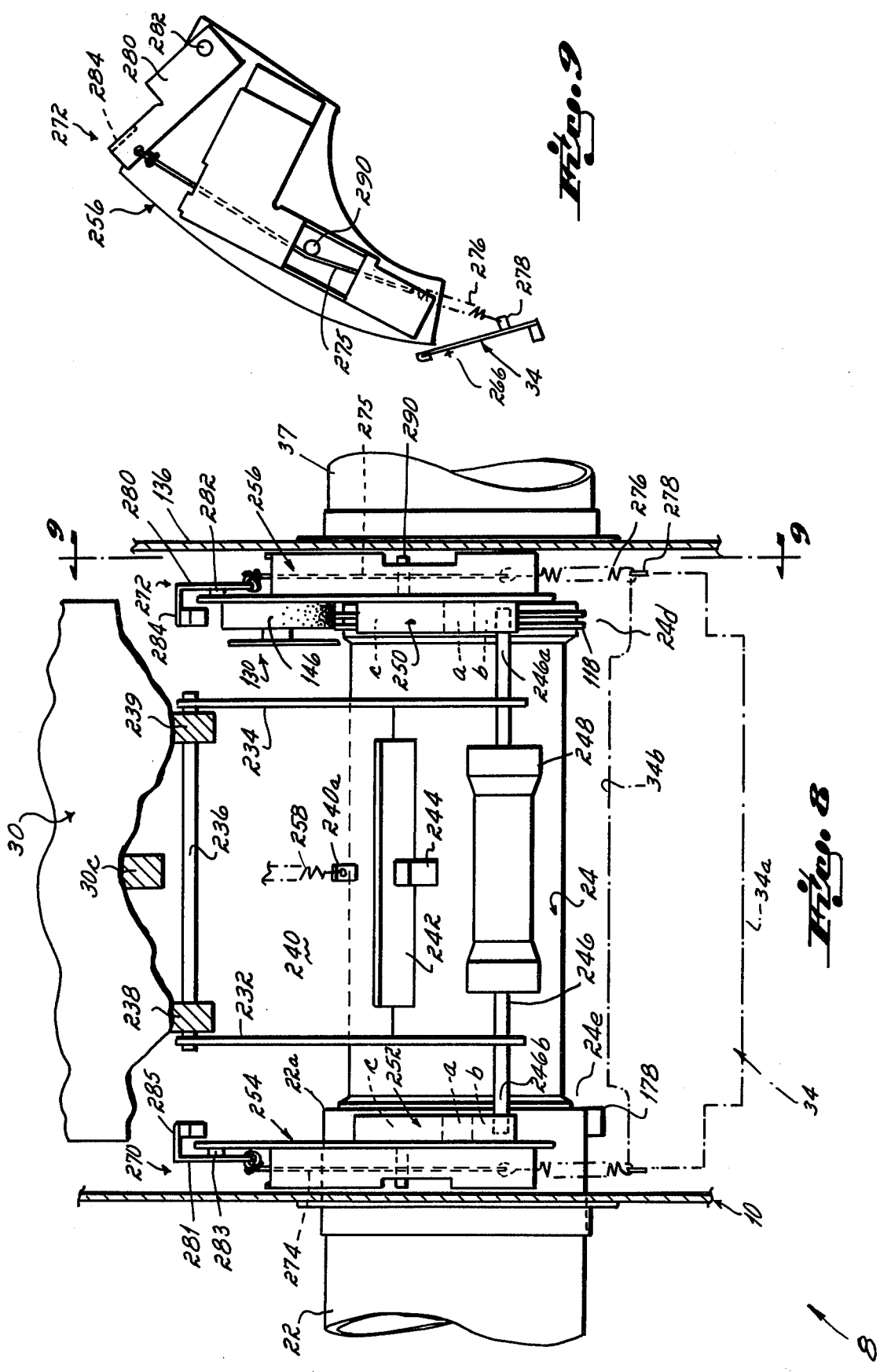

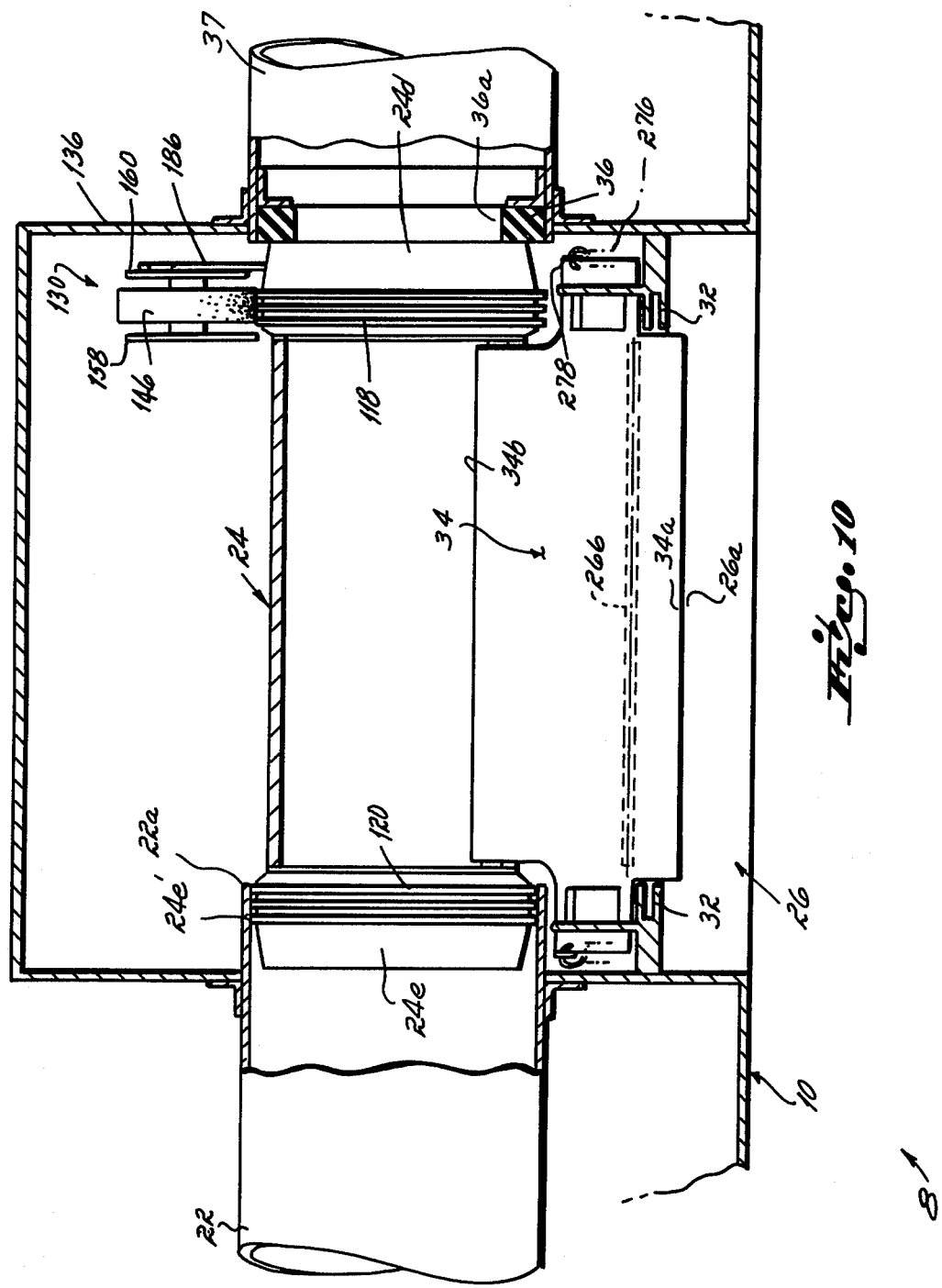

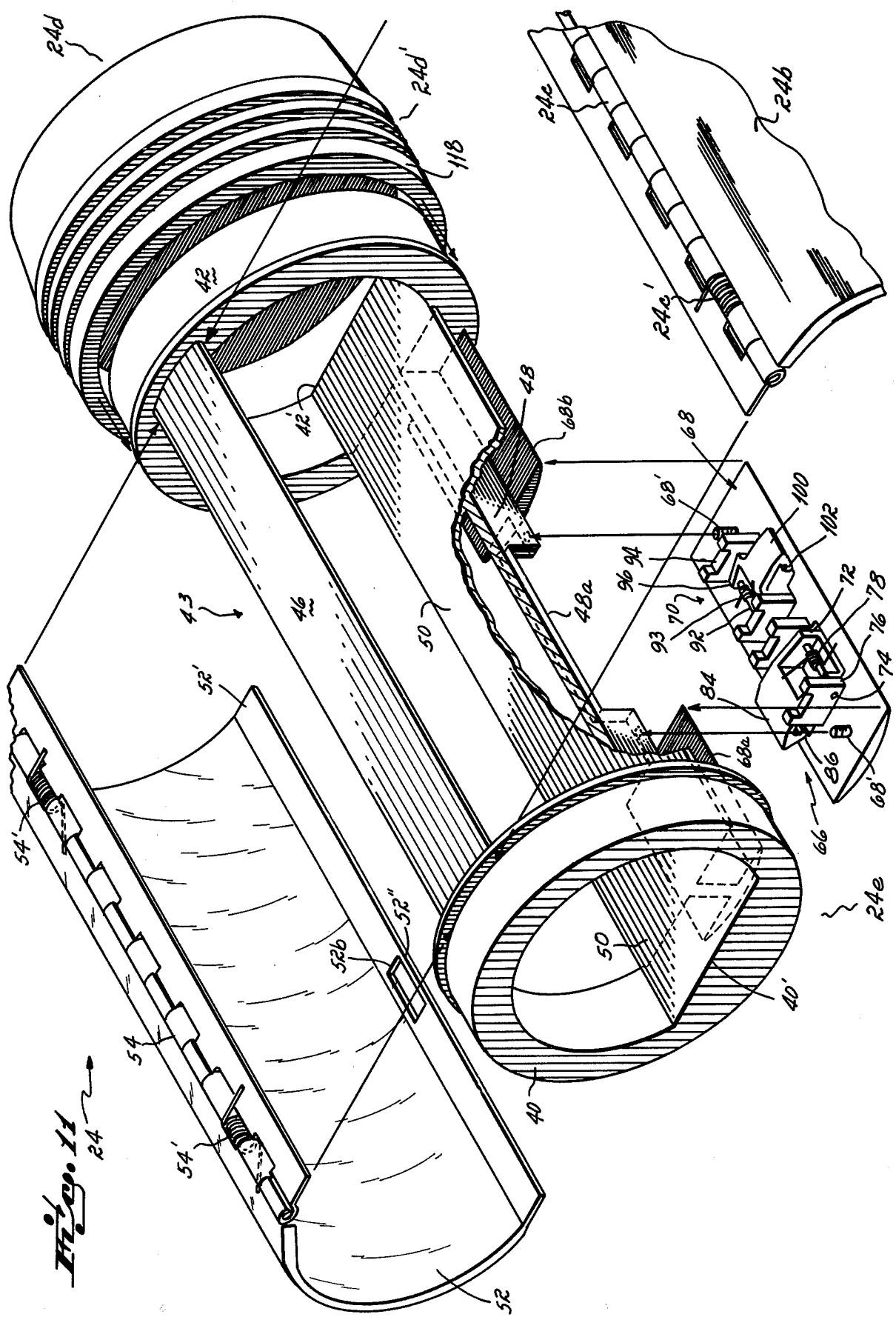

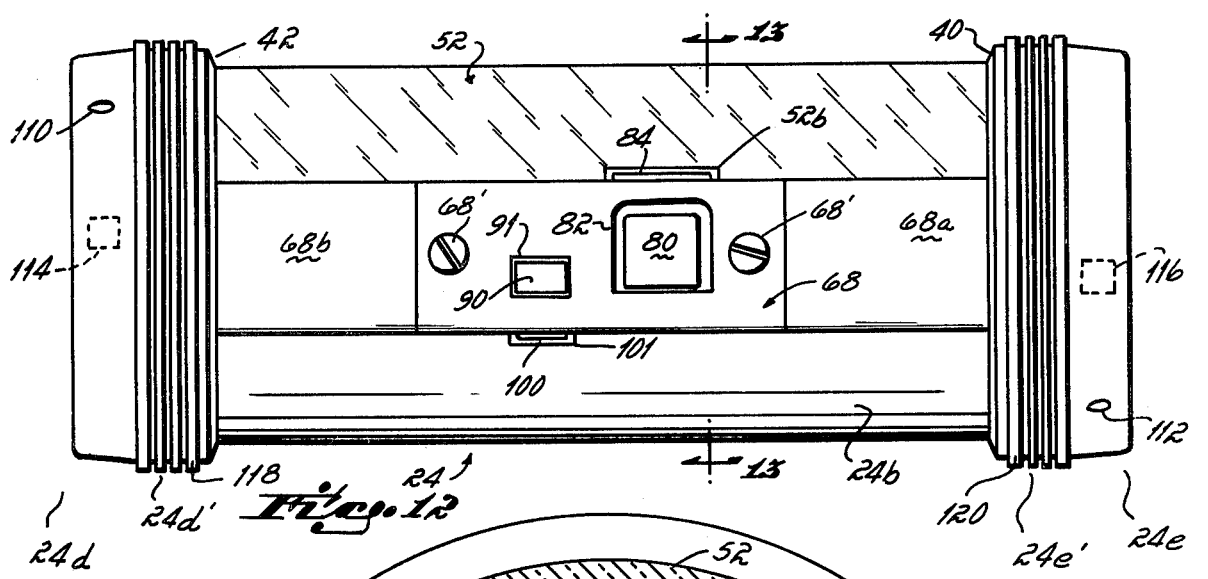
Fig. 12
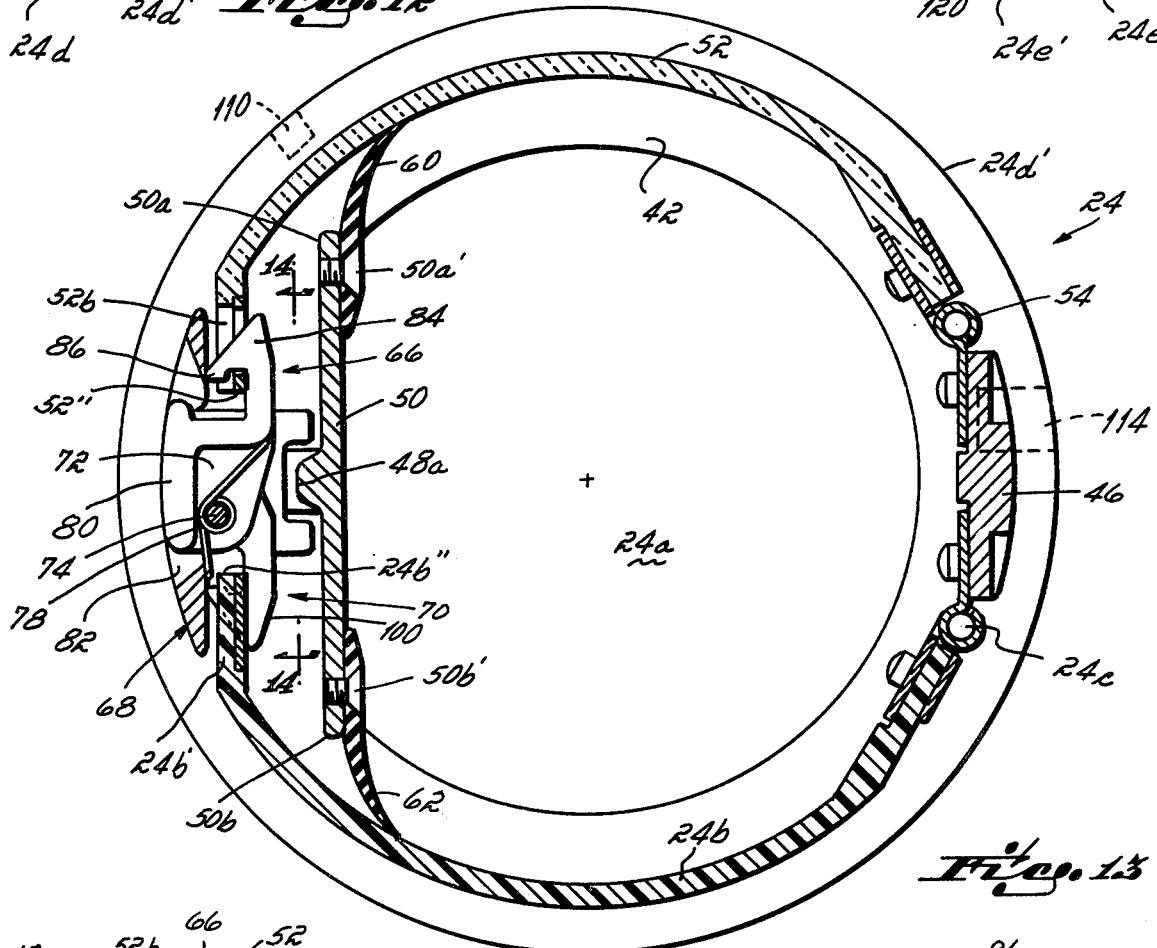
Fig. 13
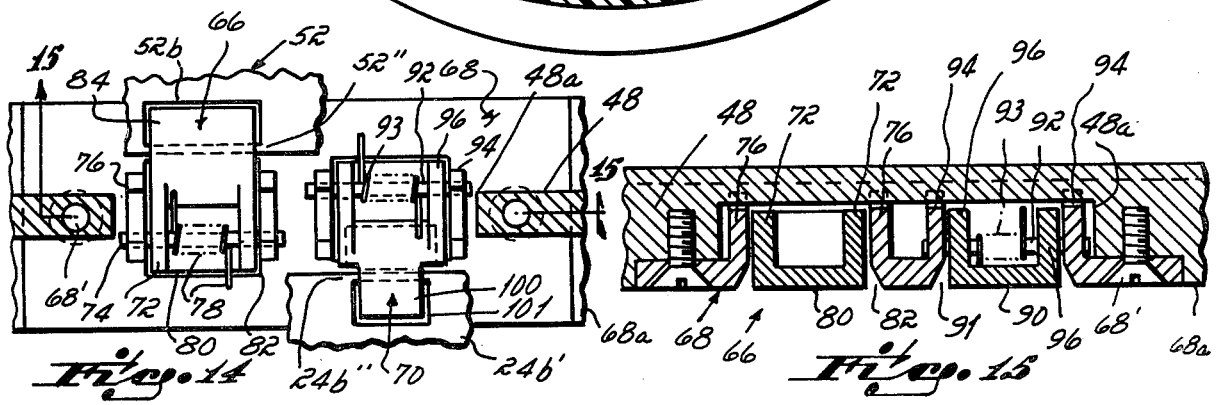
Fig. 14
Fig. 15

PNEUMATICALLY-PROPELLED CARRIER SYSTEM

This invention relates to pneumatic tube systems, and more particularly to an improved carrier and terminal for a pneumatic tube system which permits free access to the interior of the carrier when at the terminal but precludes its removal from the terminal.

Pneumatic tube systems in which a carrier or container is pneumatically propelled through a tube between distant terminals have been known and used for many years. Typically such systems can be categorized as either "free carrier" systems or "captive carrier" systems. In free carrier systems each terminal of the system is designed such that the carrier can be removed when at the terminal to provide access to the interior of the carrier for insertion and removal of articles transmitted by the carrier between the stations. In the captive carrier systems the terminals are designed such that the carrier cannot be removed. In this latter type system the side wall of the carrier typically has an opening selectively sealed with a moveable door. When the captive carrier arrives at the terminal the carrier cover, which is aligned with an access opening in the terminal, is opened and articles are inserted and/or removed therefrom to complete a transaction. Thereafter, the cover is closed and the carrier transmitted to another captive carrier terminal where the same procedure occurs.

Captive carrier systems, particularly in banking installations where the pneumatic system tube interconnects a teller terminal located inside the bank and a remote drive-up customer terminal located outside the bank, provide a number of advantages from the standpoint of the customer terminal. For example, since the carrier is captive at the customer terminal, which is located outside the bank, there is no possibility of loss or theft of the carrier and hence no carrier replacement expenses. A captive carrier terminal is also convenient for the customer since the customer does not have to go to the trouble of removing a carrier from the customer terminal and opening it, or closing the carrier and reinserting it in the terminal. In addition to being more convenient for the customer if the customer does not have to insert and remove the carrier and open and close it, a captive carrier terminal also speeds up the transaction since there is no lost time involved in removing and re-inserting a carrier and/or opening or closing the carrier as an incident to completing a banking transaction.

Unfortunately, a major disadvantage has heretofore accompanied the use of captive carrier terminal systems in that the system tube and the carrier had to have a noncirculr cross section to maintain the carrier at a fixed angular orientation in the tube such that upon arrival at the captive carrier terminal the carrier door and access opening would be in proper alignment with the terminal door and access opening. The requirement for a pneumatic tube of noncircular shape, typically oval, has unnecessarily increased the cost of the system due to the greater cost of oval tubing in comparison to circular tubing. Additionally, the cost of installing oval tubing, particularly when the tubing must make many turns in the course of traversing the distance from one captive carrier terminal to another, is considerably more than a similar installation using circular tubing.

A further disadvantage of captive carrier systems, particularly in remote transaction banking installations where a single teller services multiple teller terminals associated with different system tubes connecting the different teller terminals to respectively different customers, is that it is more time consuming for the teller per transaction and the teller is likely to make more mistakes in handling the transactions. For example, since the carriers are captive in their respective teller terminals, it is difficult for the teller to completely empty the carriers of all their contents, especially where loose coins are involved. Additionally, where the carriers are captive at the teller terminals and the teller is handling multiple transactions, the likelihood of mixing the contents of the various transactions when removed from their respective captive carriers and placed on a counter or the like, is greatly increased, as is the likelihood of returning the wrong transaction envelope to a customer. The reason for this is that when the contents of the multiple captive carriers being serviced by the teller are removed and placed on a suitable counter, as is necessary to conveniently handle them, the transaction contents become physically separated from their respective captive carriers, increasing the possibility of intermixing them and/or returning the wrong transaction to a customer.

It has been an objective of this invention to provide a pneumatically-propelled carrier system which provides at a customer station or the like the advantages of a captive carrier system, and yet at the teller terminal provides none of the disadvantages typically associated with a captive carrier system. This objective has been accomplished in accordance with certain of the principles of this invention by providing a captive terminal and a free terminal interconnected with a system tube of generally circular cross section, in combination with a carrier of generally circular cross section which is free to assume random orientations within the tube, and a carrier rotating mechanism at the captive carrier terminal for rotating the randomly orientated carrier upon arrival to a predetermined orientation in which the carrier access opening is in alignment with the access opening of the captive carrier terminal. This system, by providing a captive carrier terminal at the customer station provides all the advantages which inhere in a captive carrier system, previously described, while the utilization of a free carrier terminal at the teller station eliminates all the disadvantages of teller terminals of the captive carrier type discussed earlier. Moreover, the foregoing advantages are achieved without the considerably additional expenses typically associated with the utilization of oval tubing necessary with prior art systems of the captive carrier terminal type.

In a preferred form of the invention the carrier is provided with two access openings located in opposite side walls of the carrier body. Associated with each carrier access opening is a pivotal cover hinged along a longitudinal edge of the opening. The hinges associated with the carrier covers are located such that the covers pivot in opposite directions relative to the carrier. As a consequence, when a carrier arrives at the captive carrier terminal, regardless of which end of the carrier is leading, there is always one cover, which when its associated carrier opening is disposed in alignment with the terminal opening, will pivot in an upwardly direction, facilitating convenient access to its interior by the customer. This permits the teller to insert the carrier, either end first, into the free carrier terminal located at the teller station.

In the preferred embodiment of the carrier, a latch mechanism is provided in association with each cover, which has a pivotal latch moveable between an outer cover-locking position and an inner cover-unlocking position. Each cover is moveable between an open position, a closed position, and a release position located inwardly of the closed position. The latch and associated cover cooperate such that unlocking of the cover and release to its open position can occur only if both the latch mechanism is actuated to place the latch in its unlocking position and the cover is pressed inwardly to its release position. This requirement that both the latch mechanism and the cover be depressed avoids inadvertent opening of the cover.

To avoid unnecessarily fumbling by a teller attempting to open a carrier which has been removed from the free carrier terminal at the teller station, one of the covers is fabricated of transparent material while the other cover is opaque, and the latch mechanism associated with the transparent cover is provided with a relatively large finger-engageable tab for relatively easily depressing the latch, while the latch mechanism associated with the opaque cover is provided with a relatively small tab which is relatively difficult to manually depress. Thus, the relatively large latch-actuating tab coupled with the transparent cover function as a visual aid to the teller to assist the teller to depress the proper tab/cover combination which, as previously noted, must be jointly depressed to permit the cover to open.

In accordance with a further feature of the preferred embodiment of the invention, the captive carrier terminal is provided with a pivotal sill. Upon arrival of a carrier at the captive carrier terminal and rotation thereof to align the appropriate carrier access opening with the terminal access opening, the sill pivots to an active position, bridging the space between the lower edge of the terminal access opening and the lower edge of the aligned carrier access opening. With the sill so disposed, the contents of a transaction cannot be inadvertently dropped between the carrier and the terminal housing in the course of insertion or removal of such transaction contents from the interior of the carrier. Preferably, a sliding security door which selectively opens and closes the terminal access opening when a carrier arrives, is interconnected with the sill to automatically move the sill between its operative and inoperative positions as an incident to moving the door between its open and closed positions.

A further feature of the preferred embodiment of the invention inheres in a carrier rotating assembly for rotating a randomly oriented received carrier to a predetermined orientation in which the appropriate carrier access opening is aligned with the terminal access opening. More specifically, the carrier rotating assembly utilizes a single motor to both pivot the carrier rotating assembly into engagement with the received carrier and rotate the carrier once it is so engaged to place it in the predetermined desired rotational orientation. The carrier rotating assembly includes a frame which is mounted for rotation about a fixed axis of a motor shaft to which is keyed a first roll. A second roll in peripheral engagement with the first roll is supported by the frame. A slip drive means interconnects the motor shaft and the frame such that initial rotational motion of the motor shaft pivots the frame toward the carrier to engage the second roll with the carrier periphery, while continued rotation of the motor shaft thereafter imparts carrier-rotating motion to the second roll via the first roll which is keyed to the motor shaft to rotate the carrier to the desired orientation for access. While the carrier is being rotated, necessary slippage between the motor shaft and the frame is permitted by the slip drive means. At the conclusion of the transaction, the motor shaft is rotated in the opposite direction to return the frame to its original position clear of the carrier, permitting the carrier to be transmitted from the station without interference from the carrier rotating assembly.

In accordance with a still further feature of the preferred embodiment of the invention the carrier is provided with a floor disposed diametrically opposite the region of the carrier body which mounts the pivotal cover hinges. Associated with the floor, which is spaced inwardly from the wall of the carrier, are resilient lips disposed along its opposite longitudinal edges. When a carrier is at the captive carrier terminal with one of the carrier access openings aligned with the terminal opening and the associated carrier cover in its open position, the sill which is in its actuated condition extends underneath and against the proximately located resilient lip, sealing the sill and the exposed edge of the carrier floor, preventing transaction contents from inadvertently being placed in the space beneath the floor. When the sill has been returned to its inactive position and the carrier cover closed, the resilient lip seals the floor with respect to the proximately located cover which has now been closed. The other cover which remained closed during the transaction is also sealed by its proximately located resilient lip. As a consequence, the transaction contents do not become lodged underneath the carrier floor during transient of the carrier between the stations.

These and other features, advantages and objectives of the invention will become more readily apparent from a detailed description thereof taken in conjunction with the drawings in which:

FIG. 5 is a side elevational view in cross section of the terminal of this invention similar to FIG. 4, except the sliding terminal door is in its fully open position and the hinged door or cover of the carrier is pivoted to its fully open position;

FIG. 6 is a side elevational view of a carrier rotating assembly engaged with a carrier present in the terminal which has been rotated thereby to the desired position and locked in such position by a detent mechanism, as seen along line 6—6 of FIG. 7;

FIG. 7 is a front elevational view in cross section of the carrier rotating assembly, taken on line 7—7 of FIG. 3;

FIG. 8 is a developed front elevational view, partially cut away and partially in cross section, showing the relationship of various components of the terminal as seen along arcuate line 8—8 of FIG. 3;

FIG. 9 is a side elevational view along line 9—9 of FIG. 8 showing the deck-operating cable mechanism;

FIG. 10 is a plan view in cross section showing the relationship of the carrier, deck, and carrier rotating assembly as seen along line 10—10 of FIG. 5;

FIG. 11 is a perspective view, exploded, of a major portion of the carrier of this invention;

FIG. 12 is a bottom plan view of the carrier of FIG. 11;

FIG. 13 is a cross-sectional view of the carrier taken along line 13—13 of FIG. 12;

FIG. 14 is a cross-sectional view taken along line 14—14 of FIG. 13; and

FIG. 15 is a cross-sectional view taken along line 15—15 of FIG. 14.

Figure 1:
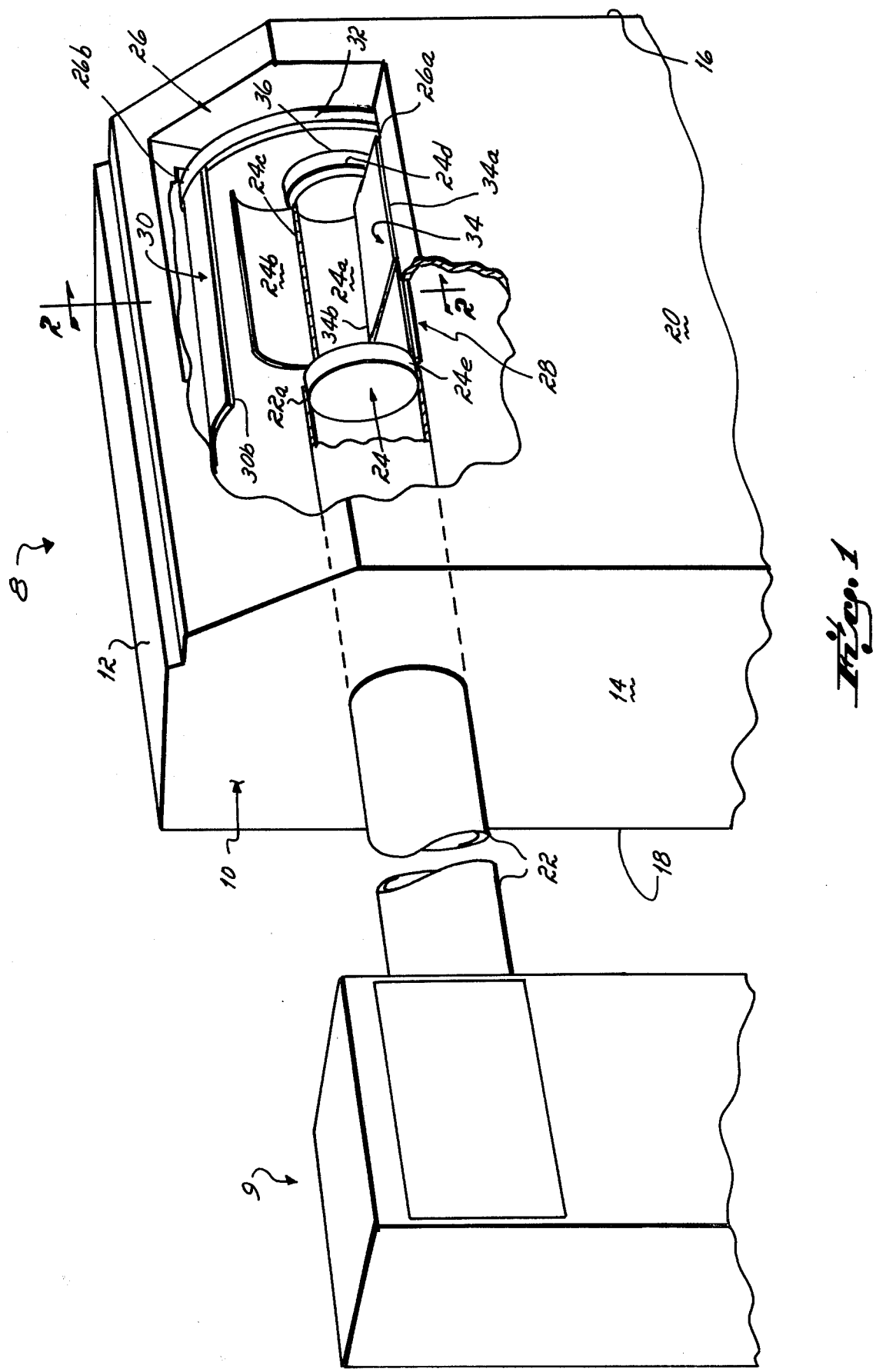
FIG. 1 is a schematic perspective view of a system which includes a pneumatic tube terminal in which the carrier is captive.

With reference to the perspective view of the captive carrier terminal 8 of this invention shown in FIG. 1, the terminal is seen to include a housing 10 having a horizontal top 12, opposite vertical side walls 14 and 16, and opposite generally vertical rear and front walls 18 and 20. The housing 10, which encloses the various operating components of the captive carrier terminal, has extending horizontally outwardly through the left side wall 14 a pneumatic system tube 22 through which carriers are bi-directionally transmitted between a remote terminal 9 and the captive carrier terminal 8 shown in FIG. 1. The remote terminal 9 to which the system tube 22 is connected preferably is of the free carrier type, that is, in which the carrier can be removed form the terminal, although it may be of the captive carrier type shown in FIG. 1 in which the carrier cannot be removed from the terminal. Suitable free carrier terminals are shown in U.S. Pat. Nos. 4,189,260 and 4,047,677, assigned to The Mosler Safe Company, the disclosures of which are incorporated herein by reference. The system tube 22 and the carrier 24 which will be described in more detail hereafter in connection with FIGS. 11-15, each have a generally circular cross-section, permitting the carrier to assume varying angular positions about its longitudinal axis when in the system tube 22, the terminal of FIG. 1, as well as the remote terminal 9 to which the system tube 22 is connected at its other end.

The front 20 of the captive carrier terminal housing 10 is provided with an access opening 26 to facilitate access by a customer using the terminal to the interior 24a of the carrier 24 which is horizontally disposed on a carrier receptacle 28 with its hinged cover or door 24b pivoted upwardly to its fully open position. The access opening 26 is normally closed by a sliding, semi-cylindrical or arcuately shaped terminal door 30, shown in its fully open position in FIG. 1, which is mounted at its opposite side edges for sliding motion between its open and closed positions in arcuate guides 32 of which only the right hand guide is shown in FIG. 1. A sill or dock 34, which is mounted for pivotal motion about a horizontal axis parallel to the longitudinal axis of the carrier 24 between a horizontal position (shown in FIG. 1) and a vertical position (shown in FIG. 2) is also provided. In the horizontal position of the deck 34, the front edge 34a of the deck overlies the horizontal lower lip 26a of the access opening 26, while the rear edge 34b of the deck extends slightly into the interior of the cavity 24a of the carrier 24 in overlying relationship to the longitudinal edge of the carrier wall parallel to the carrier cover hinge 24c which in combination with the hinge 24c defines the opening in the carrier wall which the cover 24b normally closes. The deck 34, when in its horizontal position shown in FIG. 1, functions to prevent articles being inserted or removed from the interior 24a of the carrier 24 from falling downwardly into the interior of the housing 10 between the lower horizontal lip 26a of the access opening 26 and the carrier which is spaced therefrom.

Stationarily mounted in the right hand portion of the housing interior is a donut-shaped carrier stop or bumper 36 against which the leading end 24d of an arriving carrier abuts when transmitted to the terminal 8 of FIG. 1. The bumper 36 has a central opening 36a in it (shown in FIG. 10) which communicates via a tube 37 (FIG. 10) with a blower (not shown) located in the lower portion of the housing 10 for alternately subjecting the interior of the housing, via the opening 36a in the bumper 36 and tube 37 to super-atmospheric or sub-atmospheric pressure to transmit from or receive carriers at the terminal 8 of FIG. 1. The trailing end 24e of a carrier received at the terminal of FIG. 1 in the receptacle 28 with its leading end 24d against the bumper 36, remains inserted in the right hand end 22a of the system tube 22 at all times while at terminal 8. This assures that when the interior of the housing 10 is subjected to super-atmospheric pressure from the blower (not shown), via the opening 36a in the bumper 36 and tube 37, to transmit a carrier from the terminal 8 of FIG. 1 to a distant station via the tube 22, a net pressure will exist across the opposite ends 24e and 24d of the carrier in a direction to propel it through the tube 22 to the distant station.

In operation, and assuming the terminal door 30 is in its closed position and a carrier is not on the receptacle 28, a carrier is transmitted from a remote station 9 to the captive carrier terminal 8 of FIG. 1 by energizing the blower in the housing 10 to place the interior thereof, via the opening 36a in the bumper 36 and the tube 37, at a sub-atmospheric pressure. This causes the carrier, which is placed in the system tube 22 at the remote station, to be subject to a pressure differential across its leading and trailing ends in a direction such that the carrier is propelled through the system tube toward the captive carrier terminal 8. When the carrier arrives in the terminal on the receptacle 28 its presence is sensed by a suitable carrier-responsive proximity switch, to be described, and the blower is de-energized with the carrier at rest with its leading end 24d abutting the stationary bumper 36. The sensed presence of the carrier in the receptacle 28, in addition to de-energizing the blower, is also effective to energize a carrier rotating assembly (not shown) in FIG. 1, to be described in more detail hereafter, which engages the carrier and rotates it about its longitudinal axis to an angular position such that the cover 24b is properly positioned for subsequent opening. When the carrier is in its proper rotational position, as sensed by a suitable sensor cooperating with the carrier, also to be described, the carrier rotating assembly is de-energized. Additionally, at this time a terminal door operating motor is energized and a latch on the carrier associated with the cover 24b is tripped to facilitate opening of the carrier cover 24b as an incident to movement of the terminal door to the open position, all in a manner to be described in detail hereafter.

During opening movement of the terminal door 30, and after the cover 24b of the carrier has opened, the deck or sill 34 is pivoted to the horizontal position shown in FIG. 1 by a sill-tilting mechanism, to be described, which also operates as an incident to movement of terminal door 30 to its open position. When the door 30 of the terminal 8 reaches its fully open position a limit switch associated with the terminal door is tripped, de-energizing the terminal door motor and terminating movement of the terminal door. With the terminal door 30 and the carrier cover 24b open and the sill 34 in its horizontal position, articles may be inserted and/or withdrawn from the carrier 24, as described.

Upon conclusion of the transaction, and activation of an appropriate "send" switch (not shown), the terminal door motor is energized in the opposite direction and the terminal door 30 driven to its closed position. As the terminal door 30 moves toward the closed position the sill 34 pivots vertically out of engagement with the opening in the side wall of the carrier and the carrier cover 24b is thereafter pivoted downwardly to its closed position where it latches. When the terminal door 30 and the carrier cover 24b have closed, the blower is energized and the interior of the housing 10 subjected to super-atmospheric pressure via the opening 36a in the bumper 36 and the tube 37, causing the carrier to move through the system tube 22 to the remote station.

With reference to FIGS. 10-15, the carrier 24 is described in detail. Specifically, the carrier 24, which has a generally circular cross section throughout its length, includes identical opposite ends 24d and 24e which are provided with a plurality of rings 24d' and 24e', respectively, having an external diameter which provides a snug sliding fit within the system tube 22, as shown best in FIG 10. The sliding fit between the rings 24d' and 24e' and the interior of the system tube 22 insures a relatively efficient sliding air seal between the carrier and the system tube such that when the blower is alternativey placed in its super-atmospheric and sub-atmospheric pressure state the carrier will be transmitted from the captive carrier terminal 8 or drawn to the captive carrier terminal, respectively. The ends 24d and 24e of the carrier 24 preferably are fabricated of molded plastic, with the rings 24d' and 24e' made of molded nylon.

The carrier ends 24d and 24e are mounted to spaced annular mounting rings 40 and 42 of a carrier frame 43. The mounting rings 40 and 42 are mounted to opposite ends of a pair of spaced parallel upper and lower longitudinal support bars 46 and 48. The carrier 24 is provided with a floor 50 which is secured to the upper edge of the lower longitudinal bar 48 along its longitudinal central region. At its opposite ends the floor 50 is secured to flattened portions 40' and 42' of internal surfaces of the mounting rings 40 and 42, respectively. A semi-cylindrical transparent cover 52 is pivotally connected to the longitudinal support bar 46 by a hinge 54. A second semi-cylindrical cover 24b, which for reasons to be described hereafter is opaque, is pivotally connected to the other side of the bar 46 by a hinge member 24c. Suitable hinge springs 54' and 24c' associated with the hinges 54 and 24c, respectively, bias the covers 52 and 24b to an open position. Longitudinal rubber lips 60 and 62, which have their inner longitudinal edges fastened to the floor edges 50a and 50b via suitable fasteners 50a' and 50b', are provided to seal the floor 50 with respect to the covers 52 and 24b when the covers are closed, as best seen in FIG. 13. This prevents debris from collecting below the carrier floor 50 during carrier transmission.

A spring-biased latch mechanism 66 mounted on the upper surface of a plate 68 which is secured to the lower bar 48 on opposite sides of a notch 48a therein by fasteners 68' is provided to latch the transparent door 52 in a closed position. Similarly, a latch mechanism 70 also mounted to the upper surface of the plate 68, is provided to latch the opaque door 24b in a closed position. Plate members 68a and 68b mounted to opposite ends of the bar 48 on either side of the plate 68 collectively provide along their respective longitudinal edges protective lips under which the longitudinal edges 52' and 24b' of covers 52 and 24b are located when the covers are in their closed, latched position, which is seen best in FIG. 13.

The latch mechanism 66 includes a pair of spaced ears 72, 72 which are pivotally mounted on a pin 74 disposed parallel to the longitudinal axis of the carrier between a pair of spaced ears 76, 76 which project inwardly from the upper surface of the central plate 68. The ears 72, 72 project inwardly from the inner surface of the tab 80. A spring 78 disposed about the pin 74 biases the latch member 66 in a counter-clockwise direction as viewed in FIGS. 11 and 13. The latch mechanism 66 further includes a pressure-receiving tab 80 which is positioned in an opening 82 in the plate 68. Connected to the inner surface of the tab 80 is a hook-shaped member 84 which terminates at its outer end in a tang 86. Under normal circumstances the latch mechanism 66 is in the cover lock position shown in FIG. 13 as a consequence of the bias spring 78. In such position the hook 84 projects through the opening 52b in the lip 52" of the transparent cover 52 with the tang 86 located outboard of the lip 52" of the edge 52' which defines a portion of the opening 52b. By reason of the position of the tang 86 relative to the lip portion 52", the transparent door 52 cannot open under the action of carrier cover bias springs 54' and therefore remains in its closed position.

To open the cover 52 it is necessary to apply inward pressure to the tab 80 which pivots the latch member 66 clockwise as viewed in FIG. 13 about the pin 74 from the cover lock position to the cover unlock position, as well as to press the cover 52 inwardly from its closed position to a release position such that it pivots counter-clockwise about its hinge 54. Clockwise pivoting of the latch 66 about pin 74 due to inward pressure on the tab 80 is alone insufficient to disenage the tang 86 from the edge of the lip 52" and effect release of the door 52 to its open position under the action of the hinge springs 54'. Similarly, the application of inward force to the cover 52 such that it moves counter-clockwise about hinge 54 is insufficient to disengage the tang 86 and the lip edge 52" such that the door 52 will, upon release of inward force applied to the door 52, enable the door to pivot clockwise about hinge 54 and move to the open position under the action of springs 54'. Only when the latch 66 has been pivoted clockwise about pin 74 by inward pressure on tab 80 and the cover 52 has been pivoted counter-clockwise about hinge 54 by inward pressure applied to the door 52 will the cover 52 move to the open position under the action of springs 54' when the inwardly directed force applied to the exterior of the cover 52 is released, moreover, such opening motion of the cover 52 will occur if the latch mechanism 66 is maintained in its clockwise pivotal position by the continued application of inward force to the tab 80 until the cover lip edge 52" has cleared the tang 86.

The latch 70 is identical to the latch 66 except that its tab 90, which projects through an opening 91 in the plate 68, is much smaller. Additionally, the latch 70, when pressure is applied to the tab 90 in a radially inwardly direction, pivots counter-clockwise about a mounting pin 92 mounted to radially inwardly extending ears 94, 94 mounted to the inner surface of plate 68, which pin 92 passes through ears 96, 96 which extend inwardly from the tab 90. The latch 70, like the latch 66, is provided with a hook-shaped member 100 having a tang 102. The tang cooperates with an opening 101 in the edge 24b' of the cover 24b, and in particular with the lip edge portion 24b" which defines a portion of the opening 101, in the same manner that the hook 84 and tang 86 cooperate with the opening 52b and lip portion 52" of the cover 52. That is, to release the cover 24b for counter-clockwise pivotal movement about hinge 24c to the open position it is necessary to press inwardly on the cover 24b and thereafter release it, all while inward force is applied to the tab 90 to pivot the latch 70 counter-clockwise about its mounting pin 92, overcoming the bias of spring 93, as viewed in FIG. 11 and as viewed in detail in FIG. 4.

In operation, if the remote terminal 9 in FIG. 1 connected to the other end of the system tube 22 is of the type wherein the carrier can be removed, access to the contents of the carrier by an individual using the terminal is obtained by pressing the relatively large tab finger-depressable 80 located in oversized opening 92 in plate 68 while simultaneously applying inwardly directed force to the outside of the transparent cover 52. By reason of the transparent nature of the cover 52 vis-a-vis the opaque nature of the cover 24b and the large size of the tab 80 in contrast to the relatively small size of the tab 90 located in the co-extensively sized opening 91, little fumbling is required on the part of the person manually attempting to open a carrier which has been removed from the remote station terminal. As will become more apparent hereafter the machine-depressable tab 90 and the opaque cover 24b are responsive to inwardly directed forces from the carrier cover opening mechanism located within the captive carrier terminal 8 of FIG. 1, to automatically open the carrier cover 24b when it has been rotated to the proper angular position in the receptacle 28 and the door 30 of the terminal housing 10 is moving to its open position.

The large tab 80 of latch 66 and the small tab 90 of latch 70 are located such that they are in circumferential alignment with the solenoid-operated latch-actuating pin 218 when carrier ends 24d and 24e, respectively, are leading upon entry into the terminal 8. As a consequence, and assuming the remote terminal 9 is of the "free" carrier type, the carrier will be opened with the appropriate cover 24b or 52 pivoted to its open position regardless of which end of the carrier 24d or 24e is inserted first into the remote terminal 9 prior to carrier transmission to the captive carrier terminal 8. Also, since the carrier covers 24b and 52 pivot in opposite directions relative to the carrier 24, regardless of which carrier end 24d or 24e is leading upon entry into terminal 8, the carrier cover which is actuated by the solenoid operated pin 218 will pivot upwardly, facilitating convenient access to the interior of the carrier.

To provide means for determining when the received carrier 24 seated on the receptacle 28 has been rotated to the proper angular position such that the cover 24b will fully open when the terminal door 30 is raised, each end 24d and 24e of the carrier is provided with a magnet 110 and 112 which is embedded in the respective end of the carrier. Depending upon which one of the carrier ends 24d or 24e is leading, one or the other of the magnets 110 or 112 will cooperate with a magnetic sensor properly located within the housing to sense rotation of the carrier to the desired point within the captive carrier terminal 8.

To positively lock a received carrier 24 seated in receptacle 28 at the desired point of angular rotation, each end 24d and 24e of the carrier is provided with a peripheral recess 114 and 116. When the carrier in the terminal 8 has been rotated to the desired point and continued rotation thereof terminated by the appropriately located magnetic sensor, a detent associated with the carrier rotating assembly, to be described, advances radially inwardly into engagement with the recess, maintaining the carrier in the desired rotational position.

Finally, to facilitate sensing of the arrival of the carrier 24 in the receptacle 28 of the terminal 8 such that the blower motor can be de-energized and the carrier rotating mechanism started, metal bands 118 and 120 are respectively located in opposite ends 24d and 24e of the carrier. Accordingly, and regardless of which end of the carrier is leading as it enters the receptacle 28 of the terminal 8, a metal-sensing proximity sensor will detect the arrival of the carrier.

As specifically shown in FIGS. 6 and 7 and generally in most Figures, a carrier rotating assembly 130 is provided within the terminal housing 10 behind (leftwardly as viewed in FIGS. 2–5) the leading end 24d of a carrier located on the receptacle 28 with the leading end thereof in contact with the bumper 36. The carrier rotating assembly 130 includes a motor 132 having a housing 134 stationarily mounted to a frame member 136 located within the terminal housing 10, and a rotatable motor shaft 138 which rotates about a fixed axis parallel to the longitudinal axis 140 of the carrier seated on receptacle 28 as best seen in FIG. 6. Keyed to the shaft 138 by radially disposed fasteners 142 is a metal roller 144. A rubber roll 146 which rotates about a floating shaft 148 has its periphery in frictional engagement with the periphery of the motor-driven metal roll 144 at interface 145. The floating shaft 148 of the rubber roll 146 is urged toward the motor shaft 138 by a pair of springs 150, 152 which are fastened between the opposite ends of the floating shaft 148 and pins 154 and 156 extending from parallel plates 158 and 160. The shaft 148 is positioned for sliding movement toward or away from the shaft 138 in longitudinal slots 162 and 164 formed in the plates 158 and 160. Journal bearings or bushings 166 and 168 mounted in suitably provided holes in the plates 158 and 160 permit rotation of shaft 138 relative to the plates 158 and 160.

Figure 2:
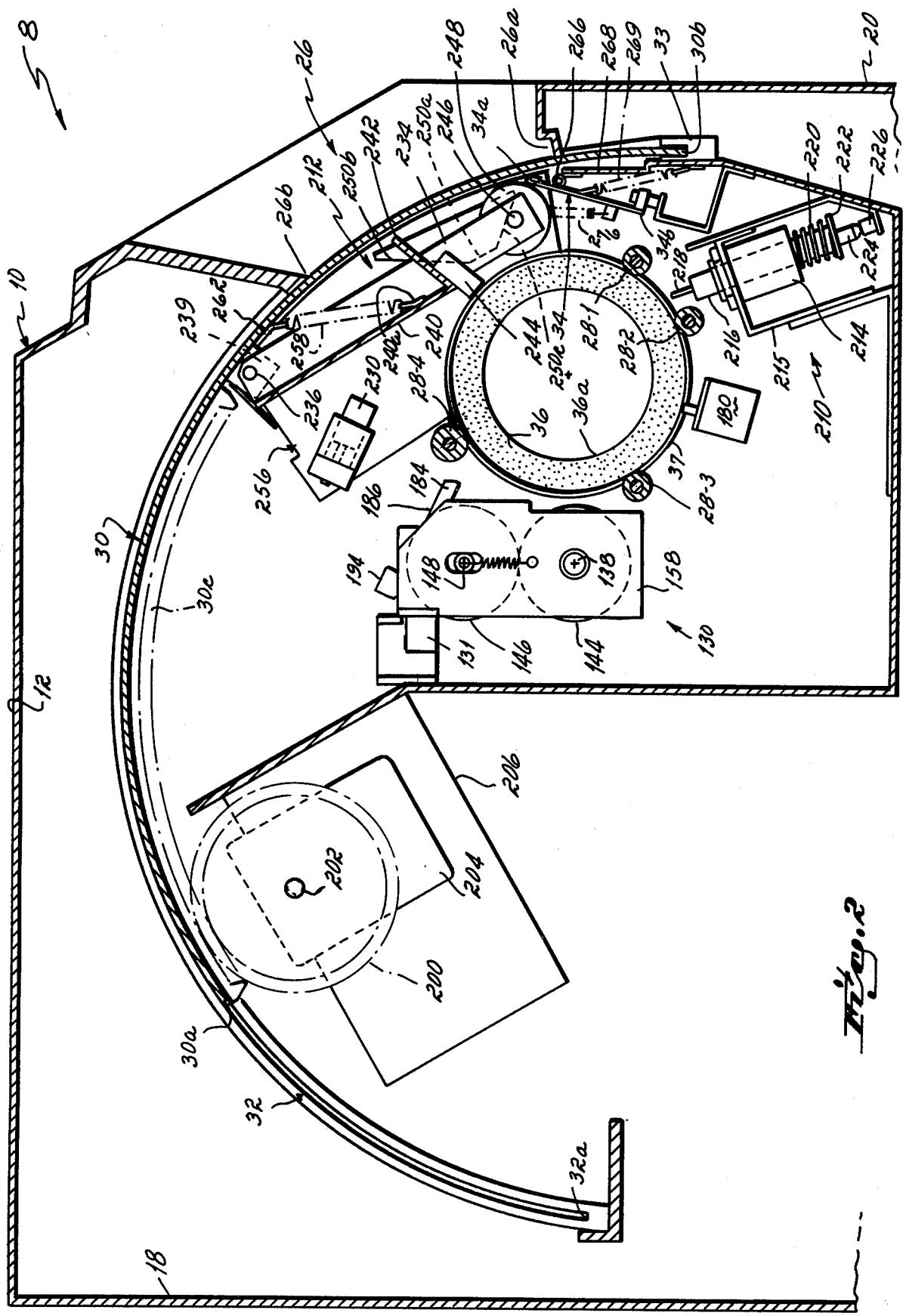
FIG. 2 is a side elevational view in cross section of the captive carrier terminal, taken generally along the lines 2—2 of FIG. 1, with the terminal door closed and a carrier not present in the terminal.
Figure 3:
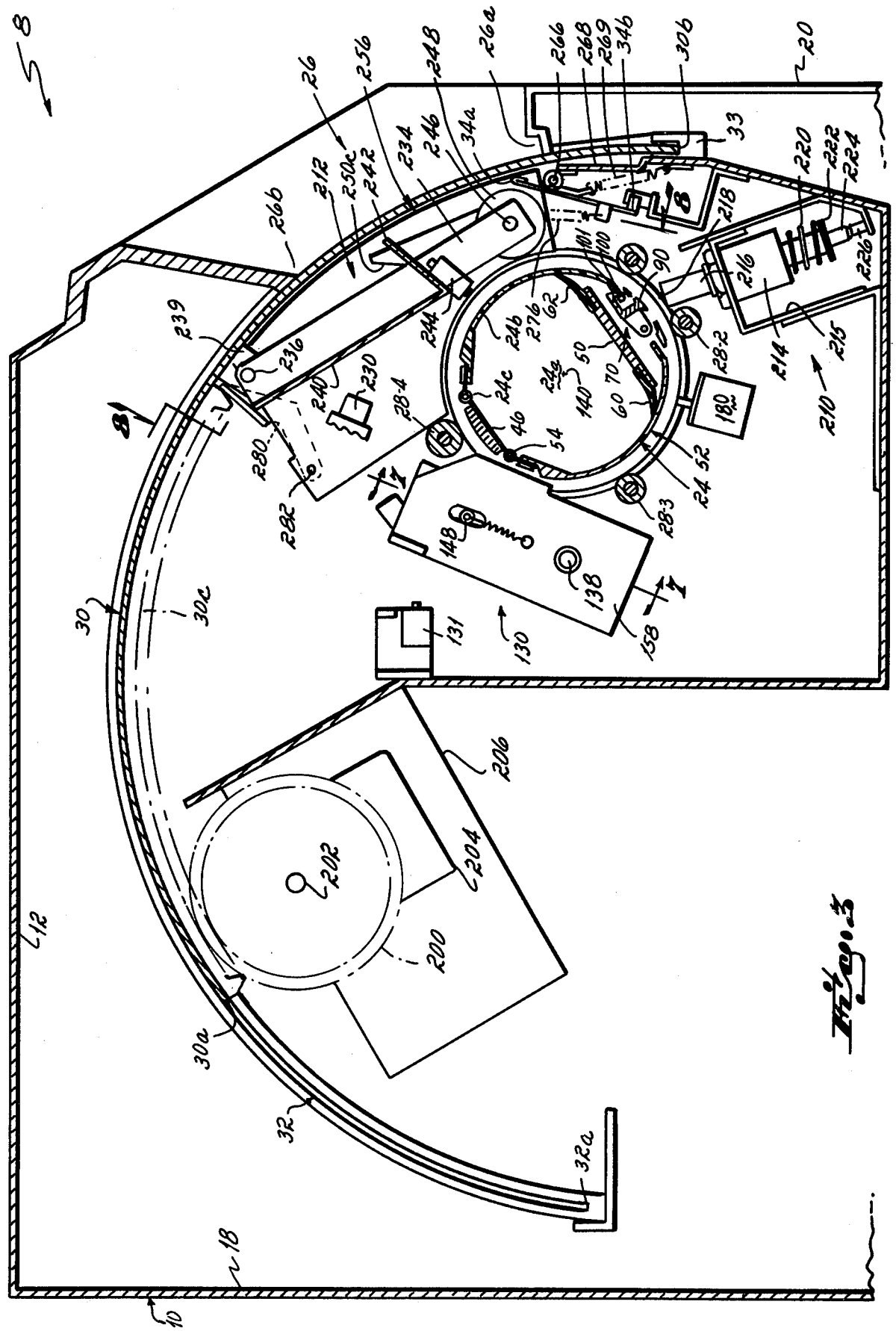
FIG. 3 is a side elevational view in cross section similar to FIG. 2, except a carrier is present in the terminal.

To enable the plates 158 and 160 to be rotatably driven by the shaft 138 during the initial rotation of the shaft 138, to move the plates and hence the rubber roll 146 from the disengaged position shown in FIG. 2 to a position in which the rubber roll 146 engages a received carrier 24 in receptacle 28 shown in FIGS. 3 and 6. Bellville-type springs 170 and 172 are provided between journal bearing shoulders 166' and 168' and respectively associated wear rings 174 and 176 located on opposite sides of the metal roll 144. The springs 170 and 172 permit rotational motion imparted to the metal roller 144 by the shaft 138 to which it is keyed to be imparted to the plates 158 and 160 to advance the plates 158 and 160 and hence the rubber roller 146 carried thereby toward or away from the received carrier in the receptacle 28 depending upon whether the motor shaft 138 is rotated in a counter-clockwise or clockwise direction as viewed in FIG. 6.

In operation, and with reference to FIGS. 6 and 7, prior to arrival of a received carrier in the receptacle 28 of the captive carrier terminal 8, the motor 132 is de-energized and the carrier rotating assembly is in the phantom line position (FIG. 6) and solid line position (FIG. 2). Upon arrival of a carrier in the receptacle 28, a suitably positioned stationarily mounted metal-sensing detector 178 senses the presence of the metal band 118 or 120 in the leading end 24d or 24e of the received carrier as it traverses the detector, and in response thereto provides an electrical control signal for energizing the motor 132. The motor shaft 138, as a consequence, is rotated in a counter-clockwise direction as viewed in FIG. 6 (clockwise in FIG. 2). Initial rotation of the shaft 138 is effective to rotate the plates 158 and 160, and hence the rubber roll 146 carried thereby, in the same direction through the action of the springs 170 and 172. When the periphery of the rubber roll 146 engages the periphery 24d' or 24e' of the leading end 24d or 24e of the arrived carrier in receptacle 28 (see FIGS. 3 and 6), the plates 158 and 160 can rotate no further. As a consequence, continued rotation of the motor shaft 138 and the metal roll 144 keyed thereto is effective to rotate the rubber roll 146 in a clockwise direction as viewed in FIG. 6. Since the rubber roll 146 is in contact with the periphery 24d' or 24e' of the leading end 24d or 24e of the carrier on the receptacle 28, rotation of the rubber roll 146 in a clockwise direction (FIG. 6) is effective to rotate the carrier in a counter-clockwise direction (FIG. 6) about its longitudinal axis 140.

Rotation of the carrier continues under the action of the rotating rubber roll 146 until the carrier magnet 110 or 112 is sensed by an appropriately located, stationarily mounted, magentic sensing switch 180 (FIGS. 2–5). When the carrier magnet 110 or 112 is sensed by magnetic sensing switch 180, an electrical signal is provided for de-energizing the motor 132 and the application of a braking force to the shaft 138 to hold it in the position it is in when the motor is de-energizied, thereby maintaining the rubber roll 146 in contact with the periphery 24d' or 24e' of the leading end 24d or 24e of the carrier 24 seated in receptacle 28 (FIG. 3).

Simultaneously with de-energization of the motor 132 and termination of further rotation of the carrier 24, a spring loaded detent 184 enters the opening 114 or 116 in the leading end 24d or 24e of the carrier 24, locking the carrier at the desired point of rotation, as shown in FIG. 6. The detent 184, considered in more detail, includes a generally elongated bar 186 from which the detent 184 extends. The bar 186 is provided with an elongated slot 188 which slideably receives a pair of headed fasteners 190 and 192 fastened to the plate 158 for guiding the bar 186 for sliding movement in the direction of the longitudinal axis of the slot 188. The outer end of the bar 186 has an ear 194 to which one end of a tension spring 196 is connected. The other end of the spring 196 is fastened to the plate 158. The spring 196 urges the bar 186 toward the carrier such that the detent 184 enters the opening 114 or 116 in the leading end 24d or 24e of the carrier located in the receptacle 28 when such opening becomes aligned with the detent which occurs when the magnet 112 or 110 is sensed by the sensor 180.

After the carrier cover 24b and the terminal door 30 have opened in a manner to be described, and a transaction has been concluded, the terminal door 30 and the carrier cover 24b are returned to their closed position, also in a manner to be described, and the motor 132 of the carrier rotating assembly 130 is energized in the opposite direction to that which occurred upon carrier arrival, that is, the motor 132 is energized to rotate the motor shaft 138 in a clockwise direction as viewed in FIG. 6. Since the plates 158 and 160 are free to move in a clockwise direction as viewed in FIG. 6, rotation of the shaft 138 and the metal roll 144 to which it is keyed in a clockwise direction as viewed in FIG. 6 is effective to rotate the plates 158 and 156, and the rubber roll 146 carried thereby, in a clockwise direction as viewed in FIG. 6. Clockwise rotation of the plates 158 and 156, as viewed in FIG. 6, returns the carrier rotating assembly 130 from the solid line position shown in FIG. 6 to the phantom line position (also, from the position shown in FIG. 3 to the position shown in FIG. 2), disengaging the detent 184 from the opening 114 or 116 in the carrier end 24d or 24e.

The carrier receptacle 28, as shown in FIGS. 1 and 2–5, includes four parallel horizontally disposed carrier guide rails or rods 28-1, 28-2, 28-3, and 28-4. The guide rails 28-1, . . . 28-4 are supported at their opposite ends in stationary brackets (not shown) which are supported between side walls 14, 16 of the housing 10. The carrier guide rails 28-1, . . . 28-4 are spaced at equal distances from the central axis 36-1 of the bumper 36 which, when a carrier is in the receptacle 28, is coincident with the longitudinal axis 140 of a received carrier in the receptacle 28. The spacing from the longitudinal axis 36-1 of the carrier guide rods 28-1, . . . 28-4 is slightly greater than the radial dimension of the carrier ends 24d and 24e such that a received carrier can slide therealong. The circumferential spacing of the carrier guides 28-1, . . . 28-4 which collectively constitute the carrier receptacle 28 is sufficient to fully cradle a carrier received in the captive carrier terminal 8, and yet not mechanically interfere with the opening and closing action of the carrier cover 24b.

The terminal door as shown in FIGS. 1–5, is generally semi-cylindrical in shape, having a rear horizontal edge 30a and a front horizontal edge 30b. The left and right edges of the door 30 guide in generally semicircular door guides 32, of which only the righthand guide is shown. When the terminal door 30 is in its closed position (FIG. 2) the arcuate length of the door guide 32 extending beyond the rear door edge 30a is seen to be greater than the sum of (a) the arcuate length of the access opening 26 measured parallel to the door guide 32 extending between the upper horizontal edge 26b of the opening 26 and the lower horizontal lip 26a and (b) the arcuate distance between the lower access opening lip 26a and a stationary elongated horizontally disposed and slotted door stop member 33 into which the lower edge of the door 30b seats when the door is in its closed position. By reason of the foregoing relationship, when the door 30 is in its fully opened position and the lower edge 30a thereof is resting against the extremity 32a of the guide 32, the front horizontal edge 30b of the door will be above the upper horizontal edge 26b of the opening 26, permitting full access to a carrier 24 seated in the receptacle 28.

To facilitate opening and closing motion of the terminal door 30, an arcuate rack 30c is provided on the lower surface of the door which cooperates with a pinion 200 which is keyed to a horizontally disposed shaft 202 of a terminal door actuating motor 204 mounted on a stationary bracket 206. The motor 204 is selectively bi-directionally driven in clockwise and counter-clockwise directions, as viewed in FIG. 2, to close and open the terminal door 30, resepectively. Switch 180, which senses rotation of a received carrier in receptacle 28 to the proper rotational orientation, is operative to start the motor 204 and open the terminal door. A limit switch (not shown) associated with the terminal door 30 de-energizes the motor when the door has reached its fully open position (FIG. 5). Similarly, a second limit switch associated with the door 30, which is also not shown, is provided to de-energize the motor 204 when, in the process of closing the door, the door has reached its fully closed position shown in FIG. 2.

To facilitate opening and closing the cover 24b of a received carrier in receptacle 28, a solenoid-operated actuating pin assembly 210 and a cover pivoting door assembly 212 are provided. The solenoid operated pin actuating assembly 210 includes a stationarily mounted solenoid 214 fastened to a bracket 215 located within the lower front portion of the housing 10. The solenoid 214 has a movable armature 216 at the upper end of which is mounted a carrier latch actuating pin 218. A spring 220 located between the lower end of the solenoid core 214 and a collar 222 fastened to the lower end of the solenoid armature 216 biases the solenoid armature in a generally downwardly direction to a point where an extension 224 of the lower end of the solenoid armature 216 abuts a stationary switch 226 which provides a signal indicating the pin 218 is disengaged from the tab 90 of latch 70. Such signal can be used to enable suitable circuitry for controlling the blower to prevent transmission of a carrier from the terminal 8 if the pin 218 has not disengaged the carrier. When the solenoid 214 is energized the armature 216 advances upwardly, driving the pin 218 in an upwardly direction which, relative to a carrier 24 in receptacle 28, is generally in a radially inward direction.

Figure 4:
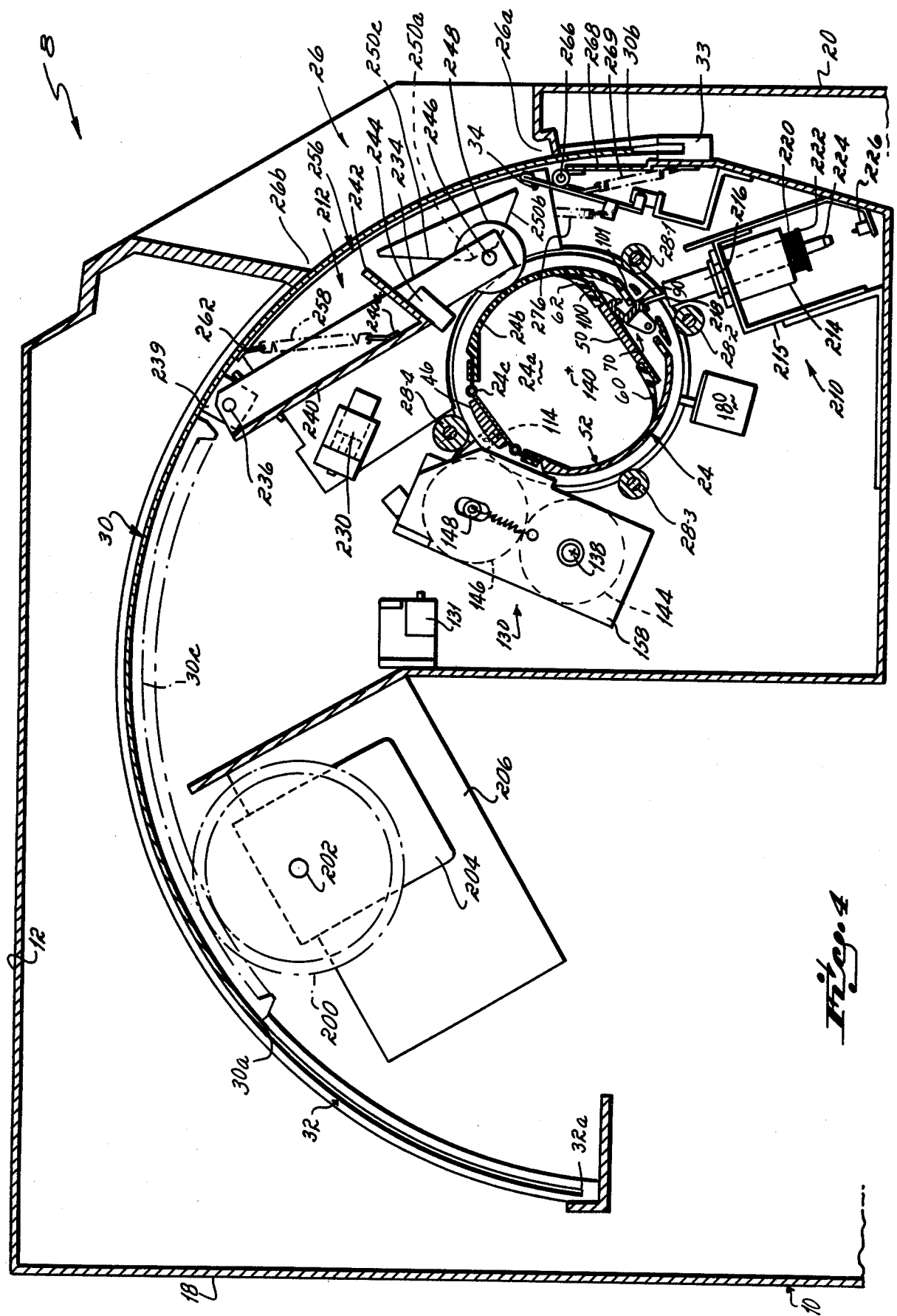
FIG. 4 is a side elevational view in cross section similar to FIG. 3, except the terminal door has slid upwardly a limited extent.

Assuming a carrier is in the receptacle 28 and has been rotated by the assembly 130 to the proper position (FIG. 3), when the solenoid 214 is energized to advance the pin 218, the pin will urge the tab 90 of the latch mechanism 70 of the properly positioned carrier in a radially inwardly direction, releasing the carrier latch mechanism (FIG. 4). The switch 180 which detects rotation of a received carrier to the desired point for energizing the door-operating motor 204, also operates to energize the solenoid 214 to release the latch mechanism 70. However, for reasons previously described, release of the latch mechanism 70 is not, by itself, sufficient to cause the spring-biased cover 24b to pivot upwardly to its open position shown in FIG. 5. The solenoid 214 remains energized, releasing the carrier latch mechanism 70, until a stationarily mounted switch 230 positioned above a received carrier senses that the carrier door 24b has pivoted to its fully opened position. When this occurs, the switch 230 causes the solenoid 214 to become de-energized.

The carrier cover pivoting door assembly 212 includes a pair of parallel links 232 and 234 which are pivotally mounted about one end on a shaft 236. The shaft 236, which is parallel to the longitudinal carrier receptacle 28, is mounted by a pair of brackets 238 and 239 fastened to the inner surface of the terminal door cover 30. To maintain the links 232 and 234 in a generally parallel orientation, a plate 240 of generally rectangular configuration is rigidly connected at its opposite side edges (FIG. 8) to the links 232 and 234. A spring 258 extending between a tab 240a formed in the plate 240 and a bracket 262 secured to the inner surface of the terminal door 30 normally biases the links 232 and 234 in a counter-clockwise direction about pivot shaft 236, as viewed in FIG. 5. The lower edge of the plate 240 has an upturned elongated tab 242 on which a proximity sensing switch 244 is mounted. The switch 244 senses, when the carrier cover is closed, that the carrier cover 24b is in a closed and locked position following a transaction. A switch (not shown) will sense the condition of terminal door 30 and, if door 30 is closed, will provide a signal to the blower to place it in a super-atmospheric pressure mode and transmit a carrier away from the terminal 8.

Supported at the lower ends of the links 232 and 234 is a shaft 246 on which an elongated roller 248 is mounted. Cooperating with the opposite ends 246a and 246b of the shaft 246, which extend substantially leftwardly and rightwardly, respectively, of the links 232 and 234, respectively, as viewed in FIG. 8, are stationary cams 250 and 252 mounted on suitable brackets 254 and 256 located within the interior of the housing 10. The location and configuration of the cams 250 and 252 is such that as the terminal door 30 is moved upwardly in the process of opening, the cams 250 and 252 engage the opposite shaft ends 246a and 246b, in turn urging the roller 248 toward and into contact with the cover 24b of a received carrier in receptacle 28 which has been properly rotationally indexed by the carrier rotating assembly 130. When the terminal door 30 reaches a point in its opening travel wherein the shaft ends 246a and 246b are in contact with cam portions 250a and 252a, the roller 248 is at its point of maximum deflection (FIG. 4) from the home or rest position (FIG. 2). At this point of maximum deflection (FIG. 4), the roller 248 depresses the pivotal cover 24b inwardly sufficiently to disengage the tang 102 of latch 70 from the carrier cover lip 24b'', permitting the cover 24b to pivot upwardly under the action of springs 24c' when the terminal door 30 continues in its upwardly position toward the fully open position shown in FIG. 5 and the shaft ends 246a and 246b ride outwardly on cam sections 250c and 252c, respectively, to move the roller 248 to its outermost position against the inner surface of the door 30. When the carrier cover 24b is in its fully opened position shown in FIG. 5, the switch 230 is tripped, which in turn de-energizes the solenoid 214, allowing the pin 218, which previously held the latch mechanism 70 in its unlatched position, to return to its normal position.

When the terminal door 30 moves from its fully open position (FIG. 5) to its fully closed position (FIG. 3), the roller 248 is once again cammed inwardly toward the carrier by the action of the cam sections 250c and 250a of cam 250 and cam sections 252c and 252a of cam 252, which position cam follower shaft ends 246a and 246b, respectively, to enable the roller 248 to return the carrier cover 24b to its closed position. When this occurs, and since the solenoid 214 has previously been de-energized, the latch mechanism 70 is in its normal latched position and the cover 24b is latched in its closed position (FIG. 3). As the door 30 returns to its fully closed position (FIG. 3) from the position shown in FIG. 4, the shaft ends 246a and 246b ride on cam sections 250b and 252b of cams 250 and 252, to return the roller 248 to its outermost position against the door 30 shown in FIG. 3. When the carrier cover 24b is in its fully closed and latched position (FIG. 3), the proximity switch 244 mounted to the tab 242 of plate 240 is activated to provide a signal indicating that the carrier cover 24b is in its fully closed and latched position. As indicated previously, this signal and the signal from the terminal door closed switch (not shown) is used to place the blower in its super-atmospheric pressure mode to transmit a carrier from the terminal 8.

The deck or sill 34, which is generally rectangular in shape, is pivotally mounted along its longitudinal axis by a hinge 266 which is disposed parallel to the lower horizontal lip 26a which defines the lower extremity of the terminal housing access opening 26. The hinge 266 is secured to the upper edge of a stationary support member 268 located in the lower front portion of the housing interior. A spring 269 connected between the stationary support member 268 and the lower surface of the sill 34 biases the sill in a counter-clockwise direction about the longitudinal hinge 266 to a position in which the sill is substantially vertically disposed (FIGS. 2, 3 and 4). To place the sill 34 in its generally horizontal orientation (FIG. 5) with its forward edge 34a overlying the access opening lip 26a and its rear edge 34b underlying the rubber lip 62 secured to the floor 50 of the carrier, a pair of sill-pivoting cable assemblies 270 and 272 are provided on opposite sides of the housing. Since the deck-pivoting cable assemblies 270 and 272 are identical, only the assembly 272 is described.

With reference to FIGS. 5, 8 and 9, the sill-pivoting assembly 272 is seen to include a cable 275 which at its lower end is connected via a spring 276 to a bracket 278 secured to the upper surface of the sill 34. The cable 275 at its upper end is connected to a lever 280 which is pivotally connected via a pin 282 to the stationary bracket 256. The lever 280 has an angulated lip 284 which engages the end 246a of roller shaft 246 when the roller shaft 246, which is carried by the cover-mounted links 232, 234, is in its uppermost position (FIG. 5) corresponding to the terminal cover 30 being in its fully opened position. As the terminal cover 30 is nearing its fully opened position, the roller shaft end 246a engages the lip 284 on lever 280 causing the lever to pivot counter-clockwise (FIG. 5) about pivot pin 282. Pivoting of the lever 280 tensions the cable 275 and pivots the sill 34 clockwise about its hinge 266, introducing the rear edge region 34b thereof into the interior of the open carrier 24 below the rubber lip 62. When in its stretched position (FIG. 5), the cable 275 guides around a horizontally disposed pin 290 anchored to the frame member 256. As the terminal door 30 moves from its fully opened position (FIG. 5) toward its closed position (FIG. 4), the shaft end 246a disengages the lever ear 284, allowing the lever 280 to pivot clockwise (FIG. 5) about pin 282, in turn permitting the sill 34 to pivot counter-clockwise about hinge 266 from the horizontal position (FIG. 5) to the vertical position (FIG. 4) under the action of spring 269. Thus, the sill 34 is returned to its normal stored vertical position with its lip 34b clear of the carrier.

The operation of the captive carrier terminal 8 is now described in connection with the receipt and subsequent transmission of a carrier 24. Prior to receipt of a carrier in the terminal 8 the various components of the system are in the position and conditions shown in FIG. 2. The terminal door 30 is in its fully closed position and the door-operating motor 204 de-energized. The sill 34 is in its generally vertically position due to the bias action of the spring 269. The solenoid 214 is de-energized and the carrier latch tab-depressing pin 218 is in its retracted position due to the action of spring 220. The door-mounted links 232 and 234 are in their outermost position due to the bias action of spring 258, as a consequence of which the roller 248 is in contact with the inner surface of the door 30 and forward and clear of the path of an incoming carrier. The carrier rotating assembly 130 is in its generally vertically position, with its carrier-rotating rubber roller 146 disposed rearwardly of the path of the carrier.

To transmit via system tube 22 to the captive carrier terminal 8 from a remote terminal connected to the opposite end of the system tube 22, the blower (not shown) in the terminal 8 is placed in its sub-atmospheric pressure mode. This places the interior of the housing 8 at sub-atmospheric pressure via the tube 37 which connects the blower to the interior of the housing through the central opening 36a in the stationary annular bumper 36 located at the righthand end (FIG. 10) of the carrier receptacle 28. With the interior of the housing 8 in a sub-atmospheric pressure condition, a carrier located in the system tube 22 at a remote terminal, whether it be a terminal of the captive carrier type or a terminal which permits removal of the carrier will be subjected to a pressure differential in a direction to propel it through the system tube 22 toward the terminal 8. During transmission to the captive carrier terminal 8, both hinged covers 52 and 24b of the carrier 24 will be fully closed and latched by their respective latch members 66 and 70.

Upon arrival of a carrier in the captive carrier terminal 8, the leading end of the carrier, which can be either end 24d or 24e, passes through the end 22a of the system tube 22 into the carrier receptacle 28 defined by horizontally disposed carrier guide rods 28-1, . . . 28-4. Assuming the carrier 24 enters the carrier receptacle 28 with end 24d leading, the leading end 24d of the carrier containing the metal band 118 will traverse the carrier-sensing proximity switch 178. Activation of the switch 178 by the metal band 118 in the leading end 24d of the arriving carrier causes the blower to be de-energized. The arriving carrier, by reason of its inertia, continues moving toward the bumper 36, eventually abutting the bumper with its leading end 24d.

Tripping of the carrier-sensing switch 178 by the arriving carrier, in addition to de-energizing the blower, is also effective to energize the motor 132 of the carrier rotating assembly 130. This causes the carrier rotating assembly 130 to initially pivot about motor-driven shaft 138 in a clockwise direction (FIG. 2) from the position shown in FIG. 2 to the position shown in FIG. 3 in which the rubber roller 146 engages the peripheral portion 24d' of the leading end 24d of the arrived carrier which is in contact with the bumper 36. Continued energization of the motor 132 of the carrier rotating assembly 130 causes the rubber roller 146 to rotate about shaft 164 in a counter-clockwise direction as viewed in FIG. 3, in turn causing the arrived carrier resting in the carrier receptacle 28 to rotate clockwise about its longitudinal axis 140. When the carrier has been rotated about its axis 140 to the desired rotational position, the magnet 110 in the leading end 24d of the arrived carrier 24 is sensed by the switch 180. Activation of the switch 180 causes the motor 132 of the carrier rotating assembly 130 to become de-energized and its shaft 138 locked, holding the rubber roller 146 in contact with the periphery 24d' of the leading end 24d of the arrived carrier. Simultaneously with the tripping of the switch 180 by the carrier magnet 110 when the carrier has rotated to the desired position, the detent 184 enters the recess 114 in the leading end of the carrier 24d, locking the carrier at the desired rotational position.

Activation of the switch 180 when the carrier has been rotated to the desired point, also energizes the solenoid 214 to advance the atmature-carried pin 218 upwardly into contact with the tab 90 of carrier latch 70 to move the hook 100 and its associated tang 102 radially inwardly to the position shown in FIG. 4 in which it is disengaged from the opening 101 in the lip 24b' of the opaque carrier cover 24b.

Tripping of the switch 180 when the arrived carrier has rotated to the desired point, is also effective to energize the terminal door motor 204, rotating the motor shaft 202 and the pinion 200 in a counter-clockwise direction as viewed in FIG. 4. As the pinion 200 rotates in a counter-clockwise direction, the rack 30c secured to the bottom surface of the semicylindrical door 30 is driven rearwardly, raising the door 30. Continued upward motion of the door 30 causes the ends 246a and 246b of the roller shaft 246 to ride up the cam sections 250b and 252b of cams 250 and 252, respectively. When the roller shaft ends 246a and 246b reach cam segments 250a and 252a, respectively, the roller 248 has reached its point of maximum inward displacement from the interior surface of the door 30 and the roller 248 has pressed the carrier cover 24b inwardly about its hinge axis 24c to the position shown in FIG. 4. The combination of the inward positioning of the cover 24b by the cam-operated roller 248 and the inward displacement of the hook 100 and tang 102 of carrier latch 70 by the solenoid-operated pin 218 is effective to release the opaque carrier cover 24b from the latch 70.

As the door 30 continues its opening motion under the operation of the motor 204, pinion 200, and rack 30c, the roller shaft ends 246a and 246b follow the profile of cam sections 250c and 252c, with the result that the roller 248 moves back into contact with the inner surface of the door 30. As the roller 248 moves toward the door 30, the unlatched carrier cover 24b is pivoted counter-clockwise by springs 24c' about hinge 24c (FIG. 4) to the open position shown in FIG. 5. When the door has reached its fully open position shown in FIG. 5, the switch 230 is activated and provides a signal indicating that the door 24b of the carrier is fully open. When the cover 24b of the carrier has reached its fully opened position (FIG. 5) tripping the switch 230, the switch 230 provides a signal to the teller that carrier cover is open. A limit switch (not shown) is activated by terminal door 30 which in turn de-energizes the solenoid 214 and returns the tab 90 of latch mechanism 70 to its normal position shown in FIG. 5 and turns off the terminal door motor 204.

Prior to the door 30 reaching its fully opened position shown in FIG. 5, the roller shaft ends 246a and 246b engage the ears 284 and 285 of the pivotally mounted levers 280 and 281. Final movement of the door to its fully opened position shown in FIG. 5 causes the levers 280 and 281 to pivot about their pivot pins 282 and 283 in a counter-clockwise direction as viewed in FIG. 5. Movement of the levers 280 and 281 in this manner causes the cables 274 and 275 to be pulled taut, which in turn pivots the sill 34 clockwise about its hinge 266, to position the rear edge 34b of the sill underneath the rubber lip 62 attached to the carrier floor 50. When the terminal door 30 has reached its fully opened position (FIG. 5) a limit switch is tripped, de-energizing the door-operating motor 204. At this point, articles can be transferred to or from the interior of the carrier 24 in furtherance of a business transaction.

When the transaction is complete, a suitable manually operated switch (not shown) is tripped by the customer, starting the terminal door operating motor 204, which rotates in a clockwise direction as viewed in FIG. 5, to return the door toward the closed position. As the door 30 moves from the fully opened position in FIG. 5 toward the closed position, the roller shaft ends 246a and 246b disengage the ears 284 and 285 of the levers 280 and 281, removing tension from the cables 274 and 275, which allows the sill 34 to pivot clockwise about its horizontal hinge 266 under the action of tension spring 269. This removes the rear edge 34b of the sill from the interior of the carrier as shown in FIG. 4.

Additionally, as the door 30 moves from the position shown in FIG. 5 to the position shown in FIG. 4, the roller 248 engages the exterior surface of the open carrier cover 24b, causing the cover 24b to be placed in its closed position as the terminal door 30 continues moving toward its closed position. When the terminal door 30 under the action of the motor 204 reaches the position shown in FIG. 4, the roller shaft ends 246a and 246b have cammed up on cam segments 250c and 252c to a point of engagement with the cam segments 250a and 252a, urging the carrier cover 24b to its innermost position. As the door continues moving toward the closed position from the position shown in FIG. 4, the roller shaft ends 246a and 246b transfer to cam sections 250b and 252b, with the result that the roller 248 moves toward the inner surface of the terminal door 30 from its position of maximum deflection shown in FIG. 4, and the cover 24b moves outwardly from the position shown in FIG. 4 to the position shown in FIG. 3 wherein it is latched in its closed position by the carrier latch mechanism 70.

The door 30 continues moving under the action of the motor 204, pinion 200, and rack 30c until the door reaches its fully closed position shown in FIG. 2. At this point, a limit switch associated with the door 30 is tripped de-energizing the door-operating motor 204. Additionally, the closed door limit switch energizes the motor 132 of the carrier rotating assembly 130 in a counter-clockwise direction as viewed in FIG. 2, to pivot the assembly 130 counter-clockwise about the shaft 138 from the position shown in FIG. 3 to the position shown in FIG. 2. When the carrier rotating assembly 130 has been returned to its normal vertical position (FIG. 2), the switch 131 senses the presence thereof and provides a signal which reflects, among other things, that the detent 184 has become disengaged from the recess 114 in the leading end 24d of the carrier. The switch 244 senses that the carrier cover 24b is in its fully closed and latched position. The combination of the signals provided by the switch 244 and the switch 131 is used to energize the blower in a super-atmospheric pressure mode. Since the end 24e of the carrier remains in the system tube end 22a while the carrier is in receptacle 28 with its leading end 24d against abutment 36, when the blower is placed in its super-atmospheric pressure mode the carrier 24 enters the tube 22 for transmission to a remote station. Upon arrival of the carrier at the remote station, a suitable carrier-sensing switch produces an electrical signal for de-energizing the blower.

We claim:

1. A system for pneumatically propelling a carrier between distant stations, comprising:
   a pneumatic tube connecting distant stations through which a carrier is pneumatically propelled between said stations, said tube having a generally circular cross-section, a carrier positionable within said tube adapted to be pneumatically propelled therethrough between said stations, said carrier being generally tubular in shape with a longitudinal axis and a cross-section which permits said carrier to be freely rotatable within said tube about its longitudinal axis, said carrier having a side wall with a first carrier access opening therein to permit insertion and removal of articles relative to the interior of said carrier, a first terminal at one of said stations connected to said tube for receiving and/or transmitting said carrier, a captive carrier terminal at another of said stations connected to said tube for receiving and transmitting said carrier, said captive carrier terminal including a terminal access opening communicating with said carrier access opening of said carrier located at said terminal when said carrier is in a first predetermined rotational orientation about its longitudinal axis relative to said captive carrier terminal, said captive carrier terminal being constructed to prevent removal of said carrier under normal operating conditions, and carrier rotating means at said captive carrier terminal for rotating said carrier located at said captive carrier terminal from a random rotational orientation about its longitudinal axis to said first predetermined rotational orientation to place said first carrier access opening and said access opening of said captive carrier terminal in communication.

2. The system of claim 1 wherein said first terminal is constructed to premit removal of said carrier during normal operation when said carrier is located thereat.

3. The system of claim 1 wherein said first terminal includes a terminal access opening communicating with said first carrier access opening of said carrier located at said first terminal when said carrier is in a second predetermined rotational orientation about its longitudinal axis relative to said first terminal, said first terminal being constructed to prevent removal of said carrier under normal operating conditions, and second carrier rotating means at said first terminal for rotating said carrier located at said second terminal from a random rotational orientation about its longitudinal axis to said second predetermined rotational orientation to place said carrier access opening and said access opening of said first terminal in communication.

4. The system of claim 1 wherein said carrier further includes a movable cover positionable between open and closed positions relative to said carrier access opening to open and close said carrier access opening, and wherein said captive carrier terminal includes carrier cover operating means to selectively open and close said carrier cover only when said carrier is in said first predetermined rotational orientation.

5. The system of claim 4 wherein said carrier cover is hingedly connected along one edge of said carrier access opening for pivotal movement between said open and closed positions, wherein said captive carrier terminal has a terminal door positionable between open and closed positions to open and close said access opening of said second terminal, and wherein said carrier cover operating means is operable in conjunction with said terminal door for opening and closing said carrier cover in conjunction with opening and closing of said terminal door.

6. The system of claim 4 wherein said captive carrier terminal includes:

a terminal door positionable between open and closed positions to open and close said captive carrier terminal access opening, and a sill movable between an operative position when said terminal door and carrier door are open to extend between said carrier and terminal access openings to inhibit articles from falling therebetween and an inoperative position when said terminal door and carrier door are closed, in which said sill does not extend between said carrier and terminal access openings.

7. The system of claim 6 wherein said carrier cover operating means is connected to said terminal door for opening and closing said carrier cover when said terminal door opens and closes, including sill-operating means connected to said terminal door for moving said sill to its operative and inoperative positions when said terminal door opens and closes.

8. The system of claim 6 wherein said sill extends into said carrier access opening when said sill is in said operative position.

9. The system of claim 8 wherein said carrier has a bottom wall, a floor in the interior thereof spaced from said bottom wall, and a lip along a longitudinal edge of said floor proximate said carrier access opening, said lip contacting the interior of said carrier cover when said cover is in its closed position to seal said floor and cover and inhibit articles in said carrier interior from becoming positioned between said carrier floor and bottom wall, and said sill contacting said lip when said sill is in its operative position to bridge said carrier floor and said terminal access opening to inhibit articles from falling therebetween when said carrier cover and terminal door are open.

10. The system of claim 7 wherein said sill is mounted to said captive carrier terminal proximate said terminal access opening for pivotal movement between its operative and inoperative positions, said sill-operating means including bias means connected to said sill for biasing said sill to its inoperative position and means interconnecting said sill and terminal door for overcoming said bias means to move said sill to its operative position when said door is placed in its open position.

11. The system of claim 1 wherein said carrier rotating means includes a carrier receiver located within said captive carrier terminal proximate said terminal access opening, said carrier receiver being in carrier transfer relation to said pneumatic tube to receive a carrier therefrom, a frame located within said captive carrier terminal proximate said carrier receiver, a first shaft rotatably mounted by said frame and rotatable about a fixed axis generally parallel to the longitudinal axis of a carrier positioned in said carrier receiver, said shaft being selectively driven in opposite directions, a first roll mounted for rotation with said first shaft, a second shaft rotatably mounted in said frame, a second roll mounted for rotation about said second shaft and in frictional engagement at its periphery with the periphery of said first roll to be driven thereby, means interconnecting said first shaft and said frame, operative when said first shaft is initially driven in a first direction, for rotating said frame about said fixed axis from an inoperative position wherein said second roll and a carrier in said receiver are not engaged to an operative position wherein said second roll is in driving contact with a carrier in said receiver, said interconnecting means permitting said first shaft to rotate relative to said frame when said second roll contacts said carrier to impart rotational motion to said carrier via said first roll and second roll, said interconnecting means transmitting motion from said first shaft to said frame to return said frame from said operative position to said inoperative position when said first shaft is rotated in a direction opposite to said first direction.

12. The system of claim 11 further including a carrier locking means mounted on said frame engageable with a carrier in contact with said second roll for locking said carrier against further rotational motion when said second roll terminates rotation of said carrier in contact therewith upon said carrier reaching said first predetermined rotational orientation.

13. The system of claim 11 wherein said carrier includes a recess formed in the periphery thereof, and said carrier locking means includes a detent mounted on said frame for movement relative to said frame between an advanced position engaged with said carrier recess to lock said carrier against rotational movement and a retracted position disengaged from said carrier recess, said detent and recess being located relative to each other to be engaged only when said carrier is in said first predetermined rotational orientation.

14. The system of claim 1 wherein said carrier further includes:
 a second carrier access opening in said side wall located opposite said first carrier access opening,
 first and second covers movably mounted to said carrier for pivotal opening and closing motion relative to said first and second access openings, respectively,
 said carrier rotating means being operative to rotate said carrier from a random rotational orientation about its longitudinal axis to a second predetermined rotational orientation to place said second carrier access opening and said terminal access opening in communication, and
 said captive carrier terminal further includes cover operating means to selectively open and close said first and second covers on an alternative basis only when said carrier is in said first and second predetermined orientations, respectively.

15. The system of claim 14 wherein said first and second covers are movably mounted to said carrier for pivotal motion in opposite directions, and wherein said carrier rotating means rotates said carrier to said first and second orientations on an alternative basis in dependence upon which one of the opposite ends of said carrier is leading as said carrier enters said captive carrier terminal.

16. The system of claim 4 wherein said cover is mounted for pivotal motion about an axis parallel to said longitudinal axis of said carrier between an outer open position, an inner closed position, and a release position slightly inwardly of said closed position, said cover having a latch-engaging element in a longitudinal edge opposite the pivotally mounted edge thereof, said carrier further including a latch mechanism having a latch mounted for pivotal motion between an inner cover unlock position and an outer cover lock position, said latch engageable in its locking position with said cover latch-engaging element when said cover is in said closed position to lock said cover closed, said latch in its unlocking position being disengaged from said cover latch-engaging element when said cover is in its release position to release said cover for movement to its open position, and wherein said carrier cover operating means, when said carrier is in said first predetermined position, moves said latch to its unlock position and said cover to its release position to release said cover for subsequent movement to its open position.

17. The system of claim 16 wherein said captive carrier terminal has a terminal door positionable between open and closed positions, and wherein said carrier cover operating means includes (a) a latch actuating mechanism to move said latch into its unlock position only when said carrier has been rotated to its first predetermined position, and (b) a cover actuating mechanism for moving said cover to its release position when said terminal door moves from its closed position to its open position.

18. The system of claim 17 wherein said cover actuating mechanism includes a cover-engaging member mounted to the interior of said door for movement therewith which momentarily engages said cover as said door opens to momentarily move said cover inward from said closed position to said release position to permit said cover to open.

19. The system of claim 18 wherein said cover-engaging member is pivotally mounted to said door interior and includes a cam follower, and wherein said cover actuating mechanism further includes a stationary cam for engaging said cam follower when said door opens to cam said cover-engaging member momentarily against said cover to momentarily move it from its closed position to its release position.

20. A terminal connectable to a pneumatic tube for receiving a carrier, comprising:
 a housing having a terminal access opening therein,
 a carrier receiver located within said carrier terminal housing to receive carriers from a pneumatic tube, said carrier receiver being proximate said terminal access opening,
 a frame located within said terminal housing proximate said carrier receiver,
 a first shaft rotatably mounted by said frame and rotatable about a fixed axis generally parallel to the longitudinal axis of a carrier positioned in said carrier receiver, said shaft being selectively driven in opposite directions,
 a first roll mounted for rotation with said first shaft,
 a second shaft rotatably mounted in said frame for limited movement toward and away from said first shaft,
 a second roll mounted for rotation about said second shaft with its periphery in contact with said first roll to drive said second roll from said first roll,
 means interconnecting said first shaft and said frame, operative when said first shaft is initially driven in a first direction, for rotating said frame about said fixed axis from an inoperative position wherein said second roll and a carrier in said receiver are not engaged to an operative position wherein said second roll is in driving contact with a carrier in said receiver, said interconnecting means permitting said first shaft to rotate relative to said frame when said second roll contacts said carrier to impart rotational motion to said carrier via said first roll and second roll to rotate said carrier to a first predetermined rotational orientation said interconnecting means transmitting motion from said first shaft to said frame to return said frame from said operative position to said inoperative position when said first shaft is rotated in a direction opposite to said first direction.

21. The system of claim 20 further including a carrier locking means mounted on said frame engageable with a carrier in contact with said second roll for locking said carrier against further rotational motion when said second roll terminates rotation of said carrier in contact therewith upon said carrier reaching said first predetermined rotational orientation.

22. The system of claim 21 wherein said carrier includes a recess formed in the periphery thereof and said carrier locking means includes a detent mounted on said frame for movement relative to said frame between an advanced position engaged with said carrier recess to lock said carrier against rotational movement and a retracted position disengaged from said carrier recess, said detent and recess being located relative to each other to be engaged only when said carrier is in said first predetermined rotational orientation.

* * * * *